United States Patent [19]

Valet

[11] Patent Number: 5,106,891
[45] Date of Patent: Apr. 21, 1992

[54] LIGHT STABILIZED COATING COMPOSITIONS CONTAINING A MIXTURE OF 2-HYDROXYPHENYLBENZOTRIAZOLE AND 2-HYDROXYPHENYLTRIAZINE

[75] Inventor: Andreas Valet, Eimeldingen, Fed. Rep. of Germany

[73] Assignee: Ciba-Geigy Corporation, Ardsley, N.Y.

[21] Appl. No.: 675,355

[22] Filed: Mar. 22, 1991

[30] Foreign Application Priority Data

Mar. 30, 1990 [CH] Switzerland ............. 1056/90

[51] Int. Cl.$^5$ ............... C08K 5/3475; C08K 5/3492
[52] U.S. Cl. ........................... 524/91; 524/99; 524/100; 524/222; 524/344
[58] Field of Search ............. 524/100, 344, 222, 99, 524/91

[56] References Cited

U.S. PATENT DOCUMENTS

| | | | |
|---|---|---|---|
| 3,268,474 | 8/1966 | Hardy et al. | 524/100 |
| 4,412,024 | 10/1983 | Avar et al. | 524/220 |
| 4,485,034 | 11/1984 | Avar et al. | 252/403 |
| 4,619,956 | 10/1986 | Susi | 524/87 |
| 4,775,707 | 10/1988 | Slongo et al. | 524/91 |
| 4,853,471 | 8/1989 | Rody et al. | 548/261 |
| 4,891,396 | 1/1990 | Avar et al. | 524/91 |
| 4,920,169 | 4/1990 | Avar | 524/219 |
| 4,973,702 | 1/1990 | Rody et al. | 548/261 |
| 4,996,326 | 2/1991 | Leppard et al. | 548/261 |

FOREIGN PATENT DOCUMENTS 0200190  1/1988  European Pat. Off.

OTHER PUBLICATIONS

Chem. Abst. 100, 193628a.

*Primary Examiner*—Paul R. Michl
*Assistant Examiner*—Tae H. Yoon
*Attorney, Agent, or Firm*—Luther A. R. Hall

[57] ABSTRACT

Coating compositions which, in addition to a 2-hydroxyphenylbenzotriazole UV absorber, also contain a UV absorber belonging to the group of the 2-hydroxyphenyltriazines, 2-hydroxybenzophenones and/or, in addition to a 2-hydroxyphenyltriazine, also contain a 2-hydroxybenzophenone and/or oxanilide are described.

17 Claims, No Drawings

LIGHT STABILIZED COATING COMPOSITIONS CONTAINING A MIXTURE OF 2-HYDROXYPHENYLBENZOTRIAZOLE AND 2-HYDROXYPHENYLTRIAZINE

The present invention relates to novel coating compositions which contain mixtures of different UV absorbers.

The effects of atmospheric oxygen, moisture and, in particular, UV light result in degradation of the polymer material in coatings. This manifests itself, for example, in the growth of cracks, loss of gloss, changes in shade, delamination and formation of bubbles. As is known, it is possible to retard such processes in coatings by the use of suitable stabilisers.

It has now been found that certain combinations of UV absorbers of different chemical structures are also capable of substantially preventing the formation of the said damage in coatings.

The present invention therefore relates to coating compositions which contain, as the UV absorber, a mixture of at least one 2-hydroxyphenylbenzotriazole and at least one 2-hydroxyphenyltriazine, and also to coating compositions which contain a mixture of at least one 2-hydroxyphenyltriazine and at least one 2-hydroxybenzophenone and/or oxanilide.

In preferred coating compositions the 2-hydroxyphenylbenzotriazole has the formula

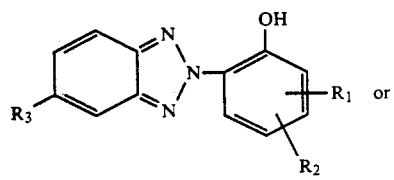
(1a)

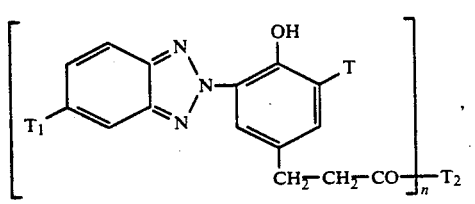
(1b)

the 2-hydroxyphenyltriazine has the formula

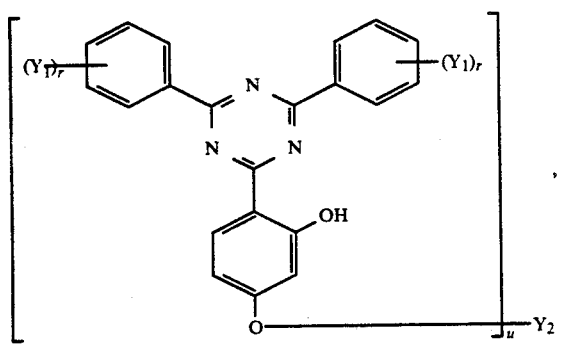
(2)

the 2-hydroxybenzophenone has the formula

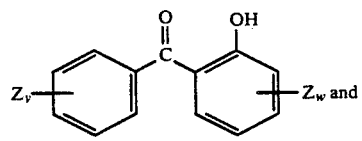
(3)

the oxanilide has the formula

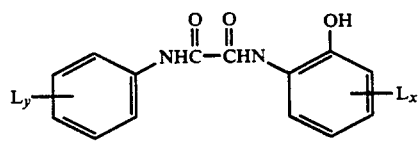
(4)

in which, in the compounds of the formula (1a), $R_1$ is hydrogen, alkyl having 1 to 24 carbon atoms, phenylalkyl having 1 to 4 carbon atoms in the alkyl moiety, cycloalkyl having 5 to 8 carbon atoms or a radical of the formula

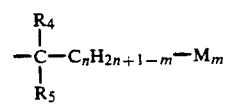

in which $R_4$ and $R_5$ independently of one another are alkyl having in each case 1 to 5 carbon atoms, or $R_4$, together with the radical $C_nH_{2n+1-m}$, forms a cycloalkyl radical having 5 to 12 carbon atoms, m is 1 or 2, n is an integer from 2 to 20 and M is a radical of the formula $-COOR_6$ in which $R_6$ is hydrogen, alkyl having 1 to 12 carbon atoms, alkoxyalkyl having in each case 1 to 20 carbon atoms in the alkyl moiety and in the alkoxy moiety or phenylalkyl having 1 to 4 carbon atoms in the alkyl moiety, $R_2$ is hydrogen, halogen, alkyl having 1 to 18 carbon atoms, and phenylalkyl having 1 to 4 carbon atoms in the alkyl moiety, and $R_3$ is hydrogen, chlorine, alkyl or alkoxy having in each case 1 to 4 carbon atoms or $-COOR_6$ in which $R_6$ is as defined above, at least one of the radicals $R_1$ and $R_2$ being other than hydrogen, in the compounds of the formula (1b) T is hydrogen or alkyl having 1 to 6 carbon atoms, $T_1$ is hydrogen, chlorine or alkyl or alkoxy having in each case 1 to 4 carbon atoms, n is 1 or 2 and, if n is 1, $T_2$ is chlorine or a radical of the formula $-OT_3$ or

and, if
n is 2, $T_2$ is a radical of the formula

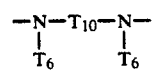

or $-O-T_9-O-$ in which $T_3$ is hydrogen, alkyl which has 1 to 18 carbon atoms and is unsubstituted or substituted by 1 to 3 hydroxyl groups or by $-OCOT_6$, alkyl which has 3 to 18 carbon atoms, is interrupted once or several times by —O— or —NT₆— and is unsubstituted or substituted by hydroxyl or —OCOT₆, cycloalkyl which has 5 to 12 carbon atoms and is unsubstituted or substituted by hydroxyl and/or alkyl having 1 to 4 carbon atoms, alkenyl which has 2 to 18 carbon atoms and is unsubstituted or substituted by hydroxyl, phenylalkyl having 1 to 4 carbon atoms in the alkyl moiety, or a radical of the formula —CH$_2$CH(OH)—T$_7$ or

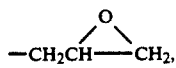

T$_4$ and T$_5$ independently of one another are hydrogen, alkyl having 1 to 18 carbon atoms, alkyl which has 3 to 18 carbon atoms and is interrupted once or several times by —O— or —NT$_6$—, cycloalkyl having 5 to 12 carbon atoms, phenyl, phenyl which is substituted by alkyl having 1 to 4 carbon atoms, alkenyl having 3 to 8 carbon atoms, phenylalkyl having 1 to 4 carbon atoms in the alkyl moiety or hydroxyalkyl having 2 to 4 carbon atoms, T$_6$ is hydrogen, alkyl having 1 to 18 carbon atoms, cycloalkyl having 5 to 12 carbon atoms, alkenyl having 3 to 8 carbon atoms, phenyl, phenyl which is substituted by alkyl having 1 to 4 carbon atoms, phenylalkyl having 1 to 4 carbon atoms in the alkyl moiety, T$_7$ is hydrogen, alkyl having 1 to 18 carbon atoms, phenyl which is unsubstituted or substituted by hydroxyl, phenylalkyl having 1 to 4 carbon atoms in the alkyl moiety, or —CH$_2$OT$_8$, T$_8$ is alkyl having 1 to 18 carbon atoms, alkenyl having 3 to 8 carbon atoms, cycloalkyl having 5 to 10 carbon atoms, phenyl, phenyl which is substituted by alkyl having 1 to 4 carbon atoms, or phenylalkyl having 1 to 4 carbon atoms in the alkyl moiety, T$_9$ is alkylene having 2 to 8 carbon atoms, alkenylene having 4 to 8 carbon atoms, alkynylene having 4 carbon atoms, cyclohexylene, alkylene which has 2 to 18 carbon atoms and is interrupted once or several times by —O—, or a radical of the formula —CH$_2$CH(OH)CH$_2$OT$_{11}$OCH$_2$CH(OH)CH$_2$— or —CH$_2$—C(CH$_2$OH)$_2$—CH$_2$—, T$_{10}$ is alkylene which has 2 to 20 carbon atoms and can be interrupted once or several times by —O—, or cyclohexylene, T$_{11}$ is alkylene having 2 to 8 carbon atoms, alkylene which has 2 to 18 carbon atoms and is interrupted once or several times by —O—, 1,3-cyclohexylene, 1,4-cyclohexylene, 1,3-phenylene or 1,4-phenylene, or T$_{10}$ and T$_6$, together with the two nitrogen atoms, are a piperazine ring, in the compounds of the formula (2) u is 1 or 2 and r is an integer from 1 to 3, the substituents Y$_1$ independently of one another are hydrogen, hydroxyl, halogenomethyl, alkyl having 1 to 12 carbon atoms, alkoxy having 1 to 18 carbon atoms, or halogen, if u is 1, Y$_2$ is alkyl having 1 to 18 carbon atoms, phenoxy which is unsubstituted or substituted by hydroxyl, alkoxy having 1 to 18 carbon atoms, or halogen, or is substituted by alkyl or alkoxy having in each case 1 to 18 carbon atoms or halogen, alkyl which has 1 to 12 carbon atoms and is substituted by —COOH, —COOY$_8$, —CONH$_2$, —CONHY$_9$, —CONY$_9$Y$_{10}$, —NH$_2$, —NHY$_9$, —NY$_9$Y$_{10}$, —NHCOY$_{11}$, —CN and/or —OCOY$_{11}$, alkyl which has 4 to 20 carbon atoms, is interrupted by one or more oxygen atoms and is unsubstituted or substituted by hydroxyl or alkoxy having 1 to 12 carbon atoms, alkenyl having 3 to 6 carbon atoms, glycidyl, cyclohexyl which is unsubstituted or substituted by hydroxyl, alkyl having 1 to 4 carbon atoms and/or —OCOY$_{11}$, phenylalkyl which has 1 to 5 carbon atoms in the alkyl moiety and is unsubstituted or substituted by hydroxyl, chlorine and/or methyl, —COY$_{12}$ or —SO$_2$Y$_{13}$, or, if u is 2, Y$_2$ is alkylene having 2 to 16 carbon atoms, alkenylene having 4 to 12 carbon atoms, xylylene, alkylene which has 3 to 20 carbon atoms, is interrupted by one or more —O— atoms and/or is substituted by hydroxyl, —CH$_2$CH(OH)CH$_2$—O—Y$_{15}$—OCH$_2$CH(OH)CH$_2$, —CO—Y$_{16}$—CO—, —CO—NH—Y$_{17}$—NH—CO— or —(CH$_2$)$_m$—CO$_2$—Y$_{18}$—OCO—(CH$_2$)$_m$, in which m is 1,2 or 3, Y$_8$ is alkyl having 1 to 18 carbon atoms, alkenyl having 3 to 18 carbon atoms, alkyl which has 3 to 20 carbon atoms, is interrupted by one or more oxygen or sulfur atoms or —NT$_6$— and/or is substituted by hydroxyl, alkyl which has 1 to 4 carbon atoms and is substituted by —P(O)(OY$_{14}$)$_2$, —NY$_9$Y$_{10}$ or —OCOY$_{11}$ and/or hydroxyl, alkenyl having 3 to 18 carbon atoms, glycidyl, or phenylalkyl having 1 to 5 carbon atoms in the alkyl moiety, Y$_9$ and Y$_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, or Y$_9$ and Y$_{10}$ together are alkylene, oxaalkylene or azaalkylene having in each case 3 to 9 carbon atoms, Y$_{11}$ is alkyl having 1 to 18 carbon atoms, alkenyl having 2 to 18 carbon atoms or phenyl, Y$_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, Y$_{13}$ is alkyl having 1 to 18 carbon atoms, phenyl or alkylphenyl having 1 to 8 carbon atoms in the alkyl radical, Y$_{14}$ is alkyl having 1 to 12 carbon atoms or phenyl, Y$_{15}$ is alkylene having 2 to 10 carbon atoms, phenylene or a group —phenylene—M—phenylene— in which M is —O—, —S—, —SO$_2$—, —CH$_2$— or —C(CH$_3$)$_2$—, Y$_{16}$ is alkylene, oxaalkylene or thiaalkylene having in each case 2 to 10 carbon atoms, phenylene or alkenylene having 2 to 6 carbon atoms, Y$_{17}$ is alkylene having 2 to 10 carbon atoms, phenylene or alkylphenylene having 1 to 11 carbon atoms in the alkyl moiety, and Y$_{18}$ is alkylene having 2 to 10 carbon atoms or alkylene which has 4 to 20 carbon atoms and is interrupted once or several times by oxygen, in the compounds of the formula (3) v is an integer from 1 to 3 and w is 1 or 2 and the substituents Z independently of one another are hydrogen, halogen, hydroxyl or alkoxy having 1 to 12 carbon atoms, and in the compounds of the formula (4) x is an integer from 1 to 3 and the substituents L independently of one another are hydrogen, alkyl, alkoxy or alkylthio having in each case 1 to 22 carbon atoms, phenoxy or phenylthio.

In the compounds of the formula (1a) R$_1$ can be hydrogen or alkyl having 1 to 24 carbon atoms, such as methyl, ethyl, propyl, butyl, hexyl, octyl, nonyl, dodecyl, tetradecyl, hexadecyl, octadecyl, nonadecyl and eicosyl and also corresponding branched isomers. Furthermore, in addition to phenylalkyl having 1 to 4 carbon atoms in the alkyl moiety, for example benzyl, R$_1$ can also be cycloalkyl having 5 to 8 carbon atoms, for example cyclopentyl, cyclohexyl and cyclooctyl, or a radical of the formula

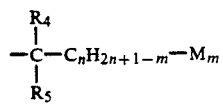

in which $R_4$ and $R_5$ independently of one another are alkyl having in each case 1 to 5 carbon atoms, in particular methyl, or $R_4$, together with the $C_nH_{2n+1-m}$ radical, forms a cycloalkyl radical having 5 to 12 carbon atoms, for example cyclohexyl, cyclooctyl and cyclodecyl. M is a radical of the formula —COOR$_6$ in which $R_6$ is not only hydrogen but also alkyl having 1 to 12 carbon atoms or alkoxyalkyl having 1 to 20 carbon atoms in each of the alkyl and alkoxy moieties. Suitable alkyl radicals $R_6$ are those enumerated for $R_1$. Examples of suitable alkoxyalkyl groups are —C$_2$H$_4$OC$_2$H$_5$, —C$_2$H$_4$OC$_8$H$_{17}$ and —C$_4$H$_8$OC$_4$H$_9$. As phenylalkyl having 1 to 4 carbon atoms, $R_6$ is, for example, benzyl, cumyl, α-methylbenzyl or phenylbutyl.

In addition to hydrogen and halogen, for example chlorine and bromine, $R_2$ can also be alkyl having 1 to 18 carbon atoms. Examples of such alkyl radicals are indicated in the definitions of $R_1$. $R_2$ can also be phenylalkyl having 1 to 4 carbon atoms in the alkyl moiety, for example benzyl, α-methylbenzyl and cumyl.

At least one of the radicals $R_1$ and $R_2$ must be other than hydrogen.

In addition to hydrogen or chlorine, $R_3$ is also alkyl or alkoxy having in each case 1 to 4 carbon atoms, for example methyl, butyl, methoxy and ethoxy, and also —COOR$_6$.

In the compounds of the formula (1b) T is hydrogen or alkyl having 1 to 6 carbon atoms, such as methyl and butyl, $T_1$ is not only hydrogen or chlorine, but also alkyl or alkoxy having in each case 1 to 4 carbon atoms, for example methyl, methoxy and butoxy, and, if n is 1, $T_2$ is chlorine or a radical of the formula —OT$_3$ or —NT$_4$T$_5$. $T_3$ is here hydrogen or alkyl having 1 to 18 carbon atoms (cf. the definition of $R_1$). These alkyl radicals can be substituted by 1 to 3 hydroxyl groups or by a radical —OCOT$_6$. Furthermore, $T_3$ can be alkyl having 3 to 18 carbon atoms (cf. the definition of $R_1$) which is interrupted once or several times by —O— or —NT$_6$— and is unsubstituted or substituted by hydroxyl or —OCOT$_6$. Examples of $T_3$ as cycloalkyl are cyclopentyl, cyclohexyl or cyclooctyl. $T_3$ can also be alkenyl having 2 to 18 carbon atoms. Suitable alkenyl radicals are derived from the alkyl radicals enumerated in the definitions of $R_1$. These alkenyl radicals can be substituted by hydroxyl. Examples of $T_3$ as phenylalkyl are benzyl, phenylethyl, cumyl, α-methylbenzyl or benzyl. $T_3$ can also be a radical of the formula —CH$_2$CH(OH)—T$_7$ or

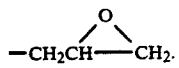

Like $T_3$, $T_4$ and $T_5$ can, independently of one another, be not only hydrogen but also alkyl having 1 to 18 carbon atoms or alkyl which has 3 to 18 carbon atoms and is interrupted once or several times by —O— or —NT$_6$—. $T_4$ and $T_5$ can also be cycloalkyl having 5 to 12 carbon atoms, for example cyclopentyl, cyclohexyl and cyclooctyl. Examples of $T_4$ and $T_5$ as alkenyl groups can be found in the illustrations of $T_3$. Examples of $T_4$ and $T_5$ as phenylalkyl having 1 to 4 carbon atoms in the alkyl moiety are benzyl or phenylbutyl. Finally, these substituents can also be hydroxyalkyl having 1 to 3 carbon atoms.

If n is 2, $T_2$ is a divalent radical of the formula

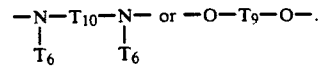

In addition to hydrogen, $T_6$ (see above also) is alkyl, cycloalkyl, alkenyl, aryl or phenylalkyl; examples of such radicals have already been given above.

In addition to hydrogen and the phenylalkyl radicals and long-chain alkyl radicals mentioned above, $T_7$ can be phenyl or hydroxyphenyl and also —CH$_2$OT$_8$ in which $T_8$ can be one of the alkyl, alkenyl, cycloalkyl, aryl or phenylalkyl radicals enumerated.

The divalent radical $T_9$ can be alkylene having 2 to 8 carbon atoms, and such radicals can also be branched. This also applies to the alkenylene and alkynylene radicals $T_9$. As well as cyclohexylene, $T_9$ can also be a radical of the formula —CH$_2$CH(OH)CH$_2$OT$_{10}$OCH$_2$CH(OH)CH$_2$— or —CH$_2$—C(CH$_2$OH)$_2$—CH$_2$—.

$T_{10}$ is a divalent radical and, in addition to cyclohexylene, is also alkylene which has 2 to 20 carbon atoms and which can be interrupted once or several times by —O—. Suitable alkylene radicals are derived from the alkyl radicals mentioned in the definitions of $R_1$.

$T_{11}$ is also an alkylene radical. It contains 2 to 8 carbon atoms or, if it is interrupted once or several times by —O—, 4 to 10 carbon atoms. $T_{11}$ is also 1,3-cyclohexylene, 1,4-cyclohexylene, 1,3-phenylene or 1,4-phenylene.

Together with the two nitrogen atoms, $T_6$ and $T_{10}$ can also be a piperazine ring.

Examples of alkyl, alkoxy, phenylalkyl, alkylene, alkenylene, alkoxylalkyl and cycloalkyl radicals and also alkylthio, oxaalkylene or azoalkylene radicals in the compounds of the formulae (2), (3) and (4) can be deduced from the above statements.

The UV absorbers of the formulae (1a), (1b), (2), (3) and (4) are known per se and are described, together with their preparation, in, for example, EP-A 323 408, EP-A 57 160, U.S. patent application Ser. No. 07/446 369 (prio.: 5.12.89), U.S. Pat. No. 4,619,956, DE-A 31 35 810 and GB-A 1 336 391. Preferred meanings of substituents and individual compounds can be deduced from the documents mentioned. They can be incorporated into coatings or coating compositions by customary methods which are known per se. As a rule the ratios of UV absorbers (all those employed) are 0.01 to 5, in particular 0.02 to 3.0,% by weight, relative to the coating composition, and the amounts of UV absorber to be selected can depend on the nature of the coating composition and the requirements for its stability. The individual UV absorber components can be added on their own or as a mixture to the appropriate coating compositions. Addition can be made to the lower layer and/or the upper layer of two-layer coatings. The upper layer preferably contains the UV absorber mixtures. The customary other additives, such as antioxidants, anticorrosion agents and other light stabiliser, can also be added to the coating compositions, without thereby impairing the protective action of the UV absorber mixtures employed in accordance with the invention.

The coating compositions according to the invention can embrace any desired type of coatings, for example pigmented or unpigmented coatings or metal effect coatings. They can contain an organic solvent or can be solvent-free or can be aqueous coatings.

The following are examples of coatings containing special binders:

1. Coatings based on alkyd, acrylate, polyester, epoxide or melamine resins which can be crosslinked under cold or hot conditions or mixturres of such resins, if appropriate with the addition of an acid curing catalyst;
2. Two-component polyurethane coatings based on acrylate, polyester or polyether resins containing hydroxyl groups, and aliphatic or aromatic polyisocyanates;
3. One-component polyurethane coatings based on masked polyisocyanates which are unmasked during stoving;
4. Two-component coatings based on (poly)ketimines and aliphatic or aromatic polyisocyanates;
5. Two-component coatings based on (poly)ketimines and an unsaturated acrylate resin or a polyacetoacetate resin or a methyl methylacrylamidoglycolate;
6. Two-component coatings based on polyacrylates and polyepoxides containing carboxyl or amino groups;
7. Two-component coatings based on acrylate resins containing anhydride groups, and a polyhydroxy or polyamino component;
8. Two-component coatings based on (poly)oxazolidines and acrylate resins or unsaturated acrylate resins or aliphatic or aromatic polyisocyanates containing anhydride groups;
9. Two-component coatings based on unsaturated polyacrylates and polymalonates;
10. Thermoplastic polyacrylate coatings based on thermoplastic acrylate resins or extraneously crosslinking acrylate resins in combination with etherified melamine resins;
11. Coating systems based on siloxane-modified acrylate resins, and
12. Coating systems based on fluorine-modified acrylate resins.

The coatings can also be coatings curable by radiation. In this case the binder consists of monomeric or oligomeric compounds which contain ethylenic double bonds and which pass over into a crosslinked, high molecular weight form as a result of irradiation with actinic light or with electron beams. In most cases these are mixtures of such compounds.

The coatings can be applied as one-layer or two-layer coatins, it being preferable to add the stabilisers according to the invention to the unpigmented uppermost layer.

The coatings can be applied to the substrates (metal, plastic, wood, etc.) by the customary processes, for example by brushing, spraying, curtain-coating, dipping or electrophoresis. It is particularly preferable for the compositions according to the invention to be coatings for motor vehicles. Suitable coating systems and binders are described, for example, in U.S. Pat. Nos. 4,314,933; 4,344,876; 4,426,471; 4,426,472 and 4,429,077.

The present invention also relates to paint films obtainable by application to a surface and curing.

Coating compositions according to the invention which are preferred are those in which the weight ratio of 2-hydroxyphenylbenzotriazole to 2-hydroxyphenyltriazine, 2-hydroxybenzophenone and/or oxanilide in the UV absorber mixture is 3:1 to 1:3, in particular 2:1 to 1:2.

Other preferred coating compositions contain, as UV absorber, a mixture of at least one 2-hydroxyphenylbenzotriazole and at least one 2-hydroxyphenyltriazine. Furthermore, compositions of interest are those containing at least one 2-hydroxyphenyltriazine and at least one 2-hydroxybenzophenone and/or oxanilide.

UV absorbers of the formula (1a) in which the substituent $R_1$ or $R_2$ is in the ortho-position or para-position relative to the hydroxyl group have proved particularly suitable in the UV absorber mixtures.

This also applies to UV absorbers of the formula (1a) in which $R_1$ is hydrogen or alkyl having 1 to 20 carbon atoms, $R_2$ is hydrogen, alkyl having 1 to 18 carbon atoms or phenylalkyl having 1 to 4 carbon atoms in the alkyl moiety and $R_3$ is hydrogen, chlorine or alkyl having 1 to 4 carbon atoms, particularly to those UV absorbers from this group in which $R_1$ is in the ortho-position relative to the hydroxyl group and is hydrogen or alkyl having 4 to 12 carbon atoms, $R_2$ is in the para-position relative to the hydroxyl group and is alkyl having 1 to 6 carbon atoms or cumyl and $R_3$ is hydrogen or chlorine, and particularly to those UV absorbers of the formula (1a) in which $R_1$ is alkyl having 8 to 12 carbon atoms, $R_2$ is alkyl having 4 to 6 carbon atoms and $R_3$ is hydrogen.

Suitable UV absorbers of the formula (1b) are those in which T is alkyl having 1 to 6 carbon atoms, $T_1$ is hydrogen, chlorine or alkyl having 1 to 4 carbon atoms, n is 1 or 2 and, if n is 1, $T_2$ is one of the radicals of the formula —$OT_3$ or

and, if n is 2, $T_2$ is a radical of the formula —O—$T_9$—O— or

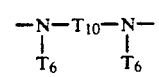

in which $T_3$ is hydrogen, alkyl having 1 to 18 carbon atoms or alkyl which has 3 to 18 carbon atoms and is interrupted once or several times by —O—, $T_4$ and $T_5$ independently of one another are hydrogen, alkyl having 1 to 18 carbon atoms, alkenyl having 3 to 8 carbon atoms or hydroxyalkyl having 1 to 3 carbon atoms, $T_6$ is hydrogen or alkyl having 1 to 6 carbon atoms, and $T_9$ and $T_{10}$ are alkylene having 2 to 8 carbon atoms, alkenylene having 4 to 8 carbon atoms or alkylene which has 4 to 18 carbon atoms and is interrupted once or several times by —O—, it being advantageous to employ those UV absorbers in which T is alkyl having 1 to 4 carbon atoms, $T_1$ is hydrogen or chlorine and $T_2$ is one of the radicals of the formula —$OT_3$ or —O—$T_9$—O— in which $T_3$ is hydrogen, alkyl having 1 to 12 carbon atoms or a radical of the formula —($C_2H_4$—($OC_2H_4$)$_{3-7}$—H— and $T_9$ is alkylene having 2 to 8 carbon atoms or a radical of the formula —($C_2H_4$—($OC_2H_4$)$_{3-7}$—O—.

In particularly suitable compounds of the formula (1b) $T_3$ is alkyl having 1 to 12 carbon atoms or a radical of the formula —($OC_2H_4$)$_{4-8}$H.

Preferred UV absorbers of the formula (2) are those in which the substituents $Y_1$ are hydrogen, alkyl having 1 to 12 carbon atoms or halogen, if u is 1, $Y_2$ is alkyl having 1 to 18 carbon atoms, alkyl which has 1 to 12 carbon atoms and is substituted by hydroxyl, alkoxy having 1 to 18 carbon atoms, —COOY$_8$, —CONY$_9$Y$_{10}$ and/or —OCOY$_{11}$, glycidyl or phenylalkyl having 1 to 4 carbon atoms in the alkyl moiety or, if u is 2, $Y_2$ is alkylene having 2 to 16 carbon atoms, alkenylene having 4 to 12 carbon atoms, xylylene or alkylene which has 3 to 20 carbon atoms, is interrupted by one or more —O— atoms and/or is substituted by hydroxyl, the substituents $Y_8$ to $Y_{11}$ being as defined above. Of these, UV absorbers which are particularly suitable are those in which the substituents $Y_1$ are hydrogen, alkyl having 1 to 4 carbon atoms or chlorine, if u is 1, $Y_2$ is alkyl which has 1 to 4 carbon atoms and is unsubstituted or substituted by hydroxyl, alkoxy having 1 to 18 carbon atoms, —COOY$_8$, —CONY$_9$Y$_{10}$ and/or —OCOY$_{11}$, glycidyl or benzyl, or, if u is 2, $Y_2$ is alkylene having 6 to 12 carbon atoms, butenylene, xylylene or alkylene which has 3 to 20 carbon atoms, is interrupted by one or more —O— atoms and/or is substituted by hydroxyl, $Y_8$ being alkyl having 4 to 12 carbon atoms, alkenylene having 12 to 18 carbon atoms or alkyl which has 6 to 20 carbon atoms, is interrupted by one or more —O— atoms and/or is substituted by hydroxyl, $Y_9$ and $Y_{10}$ being alkyl having 4 to 8 carbon atoms and $Y_{11}$ being alkyl having 1 to 8 carbon atoms or alkenyl having 2 or 3 carbon atoms.

Another group of compounds of the formula (2) which is particularly suitable for use in coating compositions is one in which u is 1 and r is 2, $Y_1$ is alkyl having 1 to 4 carbon atoms and $Y_2$ is alkyl having 1 to 12 carbon atoms or alkyl which has 1 to 12 carbon atoms and is substituted by hydroxyl, alkoxy having 1 to 18 carbon atoms, —COOY$_8$ and/or —OCOY$_{11}$, $Y_8$ being alkyl having 1 to 18 carbon atoms, alkenyl having 3 to 18 carbon atoms or alkyl which has 3 to 20 carbon atoms, is interrupted by one or more oxygen atoms and/or is substituted by hydroxyl, and $Y_{11}$ being alkenyl having 2 to 18 carbon atoms.

Of these, preferred compounds are those in which $Y_2$ is alkyl having 1 to 8 carbon atoms or alkyl which has 1 to 4 carbon atoms and is substituted by hydroxyl, alkoxy having 12 to 15 carbon atoms, —COOY$_8$ and/or —OCOY$_{11}$, $Y_8$ being alkyl having 8 to 12 carbon atoms, alkenyl having 12 to 18 carbon atoms or alkyl which has 5 to 10 carbon atoms, is interrupted by an oxygen atom and is substituted by hydroxyl, and $Y_{11}$ being alkenyl having 2 to 8 carbon atoms, and, in particular, those compounds in which $Y_1$ is methyl and $Y_2$ is an octyl radical or alkyl which has 1 to 3 carbon atoms and is substituted by hydroxyl, alkoxy having 13 or 15 carbon atoms, —COOY$_8$ and/or —OCOY$_{11}$, $Y_8$ being a decyl or octadecenyl radical or alkyl which has 7 carbon atoms and is substituted by hydroxyl and interrupted by an oxygen atom, and $Y_{11}$ being propenyl.

UV absorbers which are also of interest are those of the formula (3) in which v and w independently of one another are 1 or 2 and the substituents Z independently of one another are hydrogen, halogen or alkoxy having 1 to 12 carbon atoms, and also those UV absorbers of the formula (4) in which x and y independently of one another are 1 or 2 and the substituents L independently of one another are hydrogen or alkyl or alkoxy having in each case 1 to 12 carbon atoms.

It has proved advantageous to use, in combination with UV absorber mixtures according to the invention, at least one other light stabiliser belonging to the class of sterically hindered amines, in particular a compound containing at least one radical of the formula

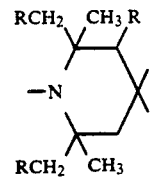

in which R is hydrogen or, preferably, methyl. These compounds are known from a large number of publications.

These are derivatives of polyalkylpiperidines, in particular of 2,2,6,6-tetramethylpiperidine. Preferably, these compounds carry one or two polar substituents or a polar spiro ring system in the 4-position of the piperidine ring. These compounds can be low-molecular-weight or oligomeric or polymeric compounds.

The following classes of polyalkylpiperidines are particularly important.

a) Compounds of the formula III

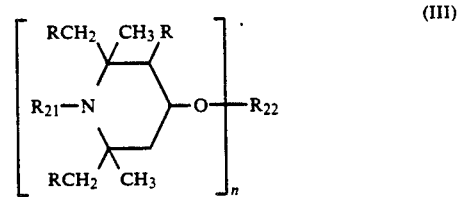

in which n is a number from 1 to 4, preferably 1 or 2, R is hydrogen or methyl, $R_{21}$ is hydrogen, oxy, hydroxyl, $C_1$-$C_{12}$alkyl, $C_3$-$C_8$alkenyl, $C_3$-$C_8$alkynyl, $C_7$-$C_{12}$aralkyl, $C_1$-$C_{18}$alkoxy, $C_5$-$C_8$cycloalkoxy, $C_7$-$C_9$-phenylalkoxy, $C_1$-$C_8$alkanoyl, $C_3$-$C_5$alkenoyl, $C_1$-$C_{18}$alkanoyloxy, benzyloxy, glycidyl or a group —CH$_2$CH(OH)—Z in which Z is hydrogen, methyl or phenyl, $R_{21}$ being preferably H, $C_1$-$C_4$alkyl, allyl, benzyl, acetyl or acryloyl and, if n is 1, $R_{22}$ being hydrogen, $C_1$-$C_{18}$alkyl which can be interrupted by one or more oxygen atoms, cyanoethyl, benzyl, glycidyl, a monovalent radical of an aliphatic, cycloaliphatic, araliphatic, unsaturated or aromatic carboxylic acid, carbamic acid or phosphorus-containing acid, or a monovalent silyl radical, preferably a radical of an aliphatic carboxylic acid having 2 to 18 C atoms, a cycloaliphatic carboxylic acid having 7 to 15 C atoms, an α,β-unsaturated carboxylic acid having 3 to 5 C atoms or an aromatic carboxylic acid having 7 to 15 C atoms, if n is 2, $R_{22}$ being $C_1$-$C_{12}$alkylene, $C_4$-$C_{12}$alkenylene, xylylene, a divalent radical of an aliphatic, cycloaliphatic, araliphatic or aromatic dicarboxylic acid, dicarbamic acid or phosphorus-containing acid or a divalent silyl radical, preferably a radical of an aliphatic dicarboxylic acid having 2 to 36 C atoms, a cycloaliphatic or aromatic dicarboxylic acid having 8-14 C atoms or an aliphatic, cycloaliphatic or aromatic dicarbamic acid having 8-14 C atoms, if n is 3, $R_{22}$ being a trivalent radical of an aliphatic, cycloaliphatic or aromatic tricarboxylic acid, an aromatic tricarbamic acid or a phosphorus-containing acid or a trivalent silyl radical, and, if n is 4, $R_{22}$ being a tetravalent radical of an aliphatic, cycloaliphatic or aromatic tetracarboxylic acid.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

When they are $C_1$–$C_{18}$alkyl, $R_{21}$ or $R_{22}$ can be, for example, the groups mentioned above and, in addition, for example n-tridecyl, n-tetradecyl, n-hexadecyl or n-octadecyl.

$R_{21}$ as $C_3$–$C_8$alkenyl can be, for example, 1-propenyl, allyl, methallyl, 2-butenyl, 2-pentenyl, 2-hexenyl, 2-octenyl or 4-tert-butyl-2-butenyl.

As $C_3$–$C_8$alkynyl, $R_{21}$ is preferably propargyl.

As $C_7$–$C_{12}$aralkyl, $R_{21}$ is especially phenethyl and, in particular, benzyl.

Examples of $R_{21}$ as $C_1$–$C_8$alkanoyl are formyl, propionyl, butyryl or octanoyl, but preferably acetyl; as $C_3$–$C_5$alkenoyl $R_{21}$ is especially acryloyl.

$R_{22}$ as a monovalent radical of a carboxylic acid is, for example, a radical of acetic acid, caproic acid, stearic acid, acrylic acid, methacrylic acid, benzoic acid or β-(3,5-di-tert-butyl-4-hydroxyphenyl)propionic acid.

$R_{22}$ as a divalent radical of a dicarboxylic acid is, for example, a radical of malonic acid, succinic acid, glutaric acid, adipic acid, suberic acid, sebacic acid, maleic acid, itaconic acid, phthalic acid, dibutylmalonic acid, dibenzylmalonic acid, butyl(3,5-di-tert-butyl-4-hydroxybenzyl)malonic acid or bicycloheptenedicarboxylic acid.

$R_{22}$ as a trivalent radical of a tricarboxylic acid is, for example, a radical of trimellitic acid, citric acid or nitrilotriacetic acid.

$R_{22}$ as a tetravalent radical of a tetracarboxylic acid is, for example, the tetravalent radical of butane-1,2,3,4-tetracarboxylic acid or of pyromellitic acid.

$R_{22}$ as a divalent radical of a dicarbamic acid is, for example, a radical of hexamethylenedicarbamic acid or 2,4-toluylenedicarbamic acid.

Preferred compounds of the formula III are those in which R is hydrogen, $R_{21}$ is hydrogen or methyl, n is 1 and $R_{22}$ is $C_1$–$C_{18}$alkyl, or n is 2 and $R_{22}$ is the diacyl radical of an aliphatic dicarboxylic acid having 4–12 C atoms.

The following compounds are examples of polyalkylpiperidine compounds of this class:
1) 4-hydroxy-2,2,6,6-tetramethylpiperidine
2) 1-allyl-4-hydroxy-2,2,6,6-tetramethylpiperidine
3) 1-benzyl-4-hydroxy-2,2,6,6-tetramethylpiperidine
4) 1-(4-tert-butyl-2-butenyl)-4-hydroxy-2,2,6,6-tetramethylpiperidine
5) 4-stearoyloxy-2,2,6,6-tetramethylpiperidine
6) 1-ethyl-4-salicyloyloxy-2,2,6,6-tetramethylpiperidine
7) 4-methacryloyloxy-1,2,2,6,6-pentamethylpiperidine
8) 1,2,2,6,6-pentamethylpiperidin-4-yl β-(3,5-di-tert-butyl-4-hydroxyphenyl)propionate
9) di-(1-benzyl-2,2,6,6-tetramethylpiperidin-4-yl) maleinate
10) di-(2,2,6,6-tetramethylpiperidin-4-yl) succinate
11) di-(2,2,6,6-tetramethylpiperidin-4-yl) glutarate
12) di-(2,2,6,6-tetramethylpiperidin-4-yl) adipate
13) di-(2,2,6,6-tetramethylpiperidin-4-yl) sebacate
14) di-(1,2,2,6,6-pentamethylpiperidin-4-yl) sebacate
15) di-(1,2,3,6-tetramethyl-2,6-diethylpiperidin-4-yl) sebacate
16) di-(1-allyl-2,2,6,6-tetramethylpiperidin-4-yl) phthalate
17) 1-hydroxy-4-β-cyanoethyloxy-2,2,6,6-tetramethylpiperidine
18) 1-acetyl-2,2,6,6-tetramethylpiperidin-4-yl acetate
19) tri-(2,2,6,6-tetramethylpiperidin-4-yl) trimellitate
20) 1-acryloyl-4-benzyloxy-2,2,6,6-tetramethylpiperidine
21) di-(2,2,6,6-tetramethylpiperidin-4-yl) diethylmalonate
22) di-(1,2,2,6,6-pentamethylpiperidin-4-yl) dibutylmalonate
23) di-(1,2,2,6,6-pentamethylpiperidin-4-yl) butyl(3,5-di-tert-butyl-4-hydroxybenzyl)malonate
24) di-(1-octyloxy-2,2,6,6-tetramethylpiperidin-4-yl) sebacate
25) di-(1-cyclohexyloxy-2,2,6,6-tetramethylpiperidin-4-yl) sebacate
26) hexane-1',6'-bis(4-carbamoyloxy-1-n-butyl-2,2,6,6-tetramethylpiperidine)
27) toluene-2',4'-bis(4-carbamoyloxy-1-n-propyl-2,2,6,6-tetramethylpiperidine)
28) dimethylbis(2,2,6,6-tetramethylpiperidin-4-oxy)silane
29) phenyltris(2,2,6,6-pentamethylpiperidin-4-oxy)silane
30) tris(1-propyl-2,2,6,6-tetramethylpiperidin-4-yl) phosphite
31) tris(1-propyl-2,2,6,6-tetramethylpiperidin-4-yl) phosphate
32) phenyl[bis(1,2,2,6,6-pentamethylpiperidin-4-yl)] phosphonate
33) 4-hydroxy-1,2,2,6,6-pentamethylpiperidine
34) 4-hydroxy-N-hydroxyethyl-2,2,6,6-tetramethylpiperidine
35) 4-hydroxy-N-(2-hydroxypropyl)-2,2,6,6-tetramethylpiperidine
36) 1-glycidyl-4-hydroxy-2,2,6,6-tetramethylpiperidine b) Compounds of the formula IV

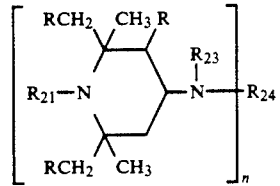

(IV)

in which n is the number 1 or 2, R and $R_{21}$ are as indicated under (a), $R_{23}$ is hydrogen, $C_1$–$C_{12}$alkyl, $C_2$–$C_5$hydroxyalkyl, $C_5$–$C_7$cycloalkyl, $C_7$–$C_8$aralkyl, $C_2$–$C_{18}$alkanoyl, $C_3$–$C_5$alkenoyl, benzoyl or a group of the formula

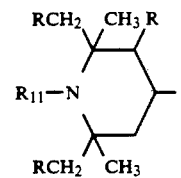

and, if n is 1, $R_{24}$ is hydrogen, $C_1$–$C_{18}$alkyl, $C_3$–$C_8$alkenyl, $C_5$–$C_7$cycloalkyl, $C_1$–$C_4$alkyl which is substituted by a hydroxyl, cyano, alkoxycarbonyl or carbamido group, glycidyl or a group of the formula —$CH_2$—CH(OH)—Z or of the formula —CONH—Z in which Z is hydrogen, methyl or phenyl; if n is 2, $R_{24}$ is $C_2$–$C_{12}$alkylene, $C_6$–$C_{12}$arylene, xylylene, a —$CH_2$—CH(OH)—$CH_2$— group or a group —$CH_2$—CH(OH)—$CH_2$—O—D—O— in which D is $C_2$–$C_{10}$alkylene, $C_6$–$C_{15}$arylene or $C_6$–$C_{12}$cycloalkylene, or, provided that $R_{23}$ is not alkanoyl, alkenoyl or benzoyl, $R_{24}$ can also be a divalent radical of an aliphatic, cycloaliphatic or aromatic dicarboxylic acid or dicarbamic acid or can also be the group —CO—, or, if n is 1, $R_{23}$ and $R_{24}$ can together be the divalent radical of an aliphatic, cycloaliphatic or aromatic 1,2-dicarboxylic or 1,3-dicarboxylic acid.

Any $C_1$-$C_{12}$alkyl or $C_1$-$C_{18}$alkyl substituents are as already defined under (a).

Any $C_5$-$C_7$cycloalkyl substituents are especially cyclohexyl.

As $C_7$-$C_8$aralkyl, $R_{23}$ is especially phenylethyl or, in particular, benzyl. As $C_2$-$C_5$hydroxyalkyl, $R_{23}$ is especially 2-hydroxyethyl or 2-hydroxypropyl.

Examples of $R_{23}$ as $C_2$-$C_{18}$alkanoyl are propionyl, butyryl, octanoyl, dodecanoyl, hexadecanoyl or octadecanoyl, but preferably acetyl; as $C_3$-$C_5$alkenoyl $R_{23}$ is especially acryloyl.

Examples of $R_{24}$ as $C_2$-$C_8$alkenyl are allyl, methallyl, 2-butenyl, 2-pentenyl, 2-hexenyl or 2-octenyl.

As $C_1$-$C_4$alkyl which is substituted by a hydroxyl, cyano, alkoxycarbonyl or carbamide group, $R_{24}$ can, for example, be 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

Any $C_2$-$C_{12}$alkylene substituents are, for example, ethylene, propylene, 2,2-dimethylpropylene, tetramethylene, hexamethylene, octamethylene, decamethylene or dodecamethylene.

If any substituents are $C_6$-$C_{15}$arylene, they are, for example, o-, m- or p-phenylene, 1,4-naphthylene or 4,4'-biphenylene.

Cyclohexylene should be mentioned particularly as $C_6$-$C_{12}$cycloalkylene.

Preferred compounds of the formula V are those in which n is 1 or 2, R is hydrogen, $R_{21}$ is hydrogen or methyl, $R_{23}$ is hydrogen, $C_1$-$C_{12}$alkyl or a group of the formula

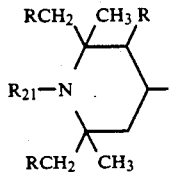

and, in the event that n is 1, $R_{24}$ is hydrogen or $C_1$-$C_{12}$alkyl and, in the event that n is 2, $R_{24}$ is $C_2$-$C_8$alkylene.

The following compounds are examples of polyalkylpiperidine compounds of this class:

37) N,N'-bis(2,2,6,6-tetramethylpiperidin-4-yl)hexamethylene-1,6-diamine
38) N,N'-bis(2,2,6,6-tetramethylpiperidin-4-yl)hexamethylene-1,6-diacetamide
39) bis(2,2,6,6-tetramethylpiperidin-4-yl)amine
40) 4-benzoylamino-2,2,6,6-tetramethylpiperidine
41) N,N'-bis(2,2,6,6-tetramethylpiperidin-4-yl)-N,N'-dibutyladipamide
42) N,N'-bis(2,2,6,6-tetramethylpiperidin-4-yl)-N,N'-dicyclohexyl-2-hydroxypropylene-1,3-diamine
43) N,N'-bis(2,2,6,6-tetramethylpiperidin-4-yl)-p-xylylenediamine
44) N,N'-bis(2,2,6,6-tetramethylpiperidin-4-yl)succinamide
45) di-(2,2,6,6-tetramethylpiperidin-4-yl) N-(2,2,6,6-tetramethylpiperidin-4-yl)-$\beta$-aminodipropionate
46) The compound of the formula

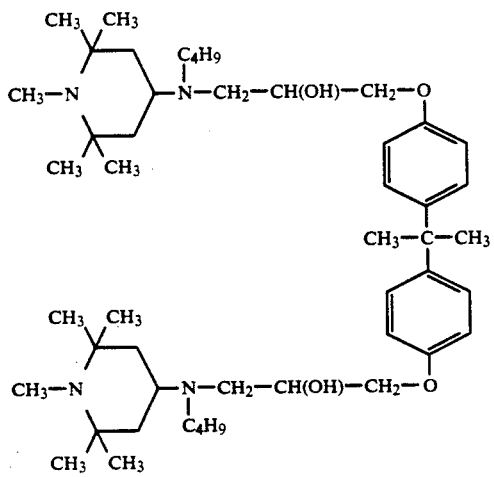

47) 4-(bis-2-hydroxyethylamino)-1,2,2,6,6-pentamethylpiperidine
48) 4-(3-methyl-4-hydroxy-5-tert-butylbenzamido)-2,2,6,6-tetramethylpiperidine
49) 4-methacrylamido-1,2,2,6,6-pentamethylpiperidine
49) (a) to (c) the compounds of the formula

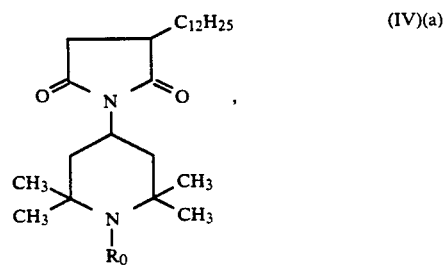

in which $R_0$ is hydrogen, methyl or acetyl.

c) Compounds of the formula (V)

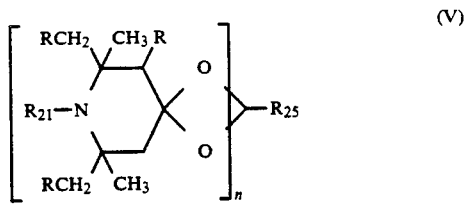

in which n is the number 1 or 2, R and $R_{21}$ are as defined under (a) and, if n is 1, $R_{25}$ is $C_2$-$C_8$alkylene, $C_2$-$C_8$hydroxyalkylene or $C_4$-$C_{12}$acyloxyalkylene, and, if n is 2, $R_{25}$ is the group (—$CH_2$)$_2$C(CH$_2$—)$_2$.

Examples of $R_{25}$ as $C_2$-$C_8$alkylene or $C_2$-$C_8$hydroxyalkylene are ethylene, 1-methylethylene, propylene, 2-ethylpropylene or 2-ethyl-2-hydroxymethylpropylene.

An example of $R_{25}$ as $C_4$-$C_{22}$acyloxyalkylene is 2-ethyl-2-acetoxymethylpropylene.

The following compounds are examples of polyalkylpiperidine compounds of this class:

50) 9-aza-8,8,10,10-tetramethyl-1,5-dioxaspiro[5.5]undecane 51) 9-aza-8,8,10,10-tetramethyl-3-ethyl-1,5-dioxaspiro[5.5]undecane
52) 8-aza-2,7,7,8,9,9-hexamethyl-1,4-dioxaspiro[4.5]decane
53) 9-aza-3-hydroxymethyl-3-ethyl-8,8,9,10,10-pentamethyl-1,5-dioxaspiro[5.5]undecane
54) 9-aza-3-ethyl-3-acetoxymethyl-9-acetyl-8,8,10,10-tetramethyl-1,5-dioxaspiro-[5.5]undecane
55) 2,2,6,6-tetramethylpiperidine-4-spiro-2'-(1',3'-dioxane)-5'-spiro-5''-(1'',3''-dioxane)-2''-spiro-4'''-(2''',2''',6''',6'''-tetramethylpiperidine).

(d) Compounds of the formulae VIA, VIB und VIC

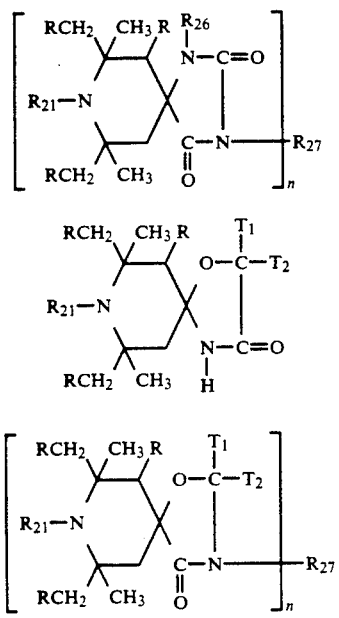

in which n is the number 1 or 2, R and $R_{21}$ are as defined under (a), $R_{26}$ is hydrogen, $C_1$–$C_{12}$alkyl, allyl, benzyl, glycidyl or $C_2$–$C_6$alkoxyalkyl and, if n is 1, $R_{27}$ is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl or a group of the formula —(CH$_2$)$_p$—COO—Q or of the formula —(CH$_2$)$_p$—O—CO—Q in which p is 1 or 2 and Q is $C_1$–$C_4$alkyl or phenyl or, if n is 2, $R_{27}$ is $C_2$–$C_{12}$alkylene, $C_4$–$C_{12}$alkenylene, $C_6$–$C_{12}$arylene, a group —CH$_2$—CH(OH)—CH$_2$—O—D—O—CH$_2$—CH(OH)—CH$_2$— in which D is $C_2$–$C_{10}$alkylene, $C_6$–$C_{15}$arylene or $C_6$–$C_{12}$cycloalkylene, or a group —CH$_2$CH(OZ')CH$_2$—(OCH$_2$—CH(OZ')CH$_2$)$_2$— in which Z' is hydrogen, $C_1$–$C_{18}$alkyl, allyl, benzyl, $C_2$–$C_{12}$alkanoyl or benzoyl, and $T_1$ and $T_2$ independently of one another are hydrogen, $C_1$–$C_{18}$alkyl or $C_6$–$C_{10}$aryl or $C_7$–$C_9$aralkyl each of which is unsubstituted or substituted by halogen or $C_1$–$C_4$alkyl, or $T_1$ and $T_2$, together with the C atom linking them, form a $C_5$–$C_{12}$cycloalkane ring.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Examples of possible substituents which are $C_1$–$C_{18}$alkyl can be the groups mentioned above and additionally, for example, n-tridecyl, n-tetradecyl, n-hexadecyl or n-octadecyl.

Any $C_2$–$C_6$alkoxyalkyl substitutents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

Examples of $R_{27}$ as $C_3$–$C_5$alkenyl are 1-propenyl, allyl, methallyl, 2-butenyl or 2-pentenyl.

As $C_7$–$C_9$aralkyl $R_{27}$, $T_1$ and $T_2$ are especially phenethyl or, in particular, benzyl. If $T_1$ and $T_2$ together with the C atom form a cycloalkane ring, this can, for example, be a cyclopentane, cyclohexane, cyclooctane or cyclododecane ring.

Examples of $R_{27}$ as $C_2$–$C_4$hydroxyalkyl are 2-hydroxyethyl, 2-hydroxypropyl, 2-hydroxybutyl or 4-hydroxybutyl.

As $C_6$–$C_{10}$aryl $R_{17}$, $T_1$ and $T_2$ are especially phenyl, α-naphthyl or β-naphthyl which are unsubstituted or substituted by halogen or $C_1$–$C_4$alkyl.

Examples of $R_{27}$ as $C_2$–$C_{12}$alkylene are ethylene, propylene, 2,2-dimethylpropylene, tetramethylene, hexamethylene, octamethylene, decamethylene or dodecamethylene.

As $C_4$–$C_{12}$alkenylene $R_{27}$ is especially 2-butenylene, 2-pentenylene or 3-hexenylene.

Examples of $R_{27}$ as $C_6$–$C_{12}$arylene are o-, m- or p-phenylene, 1,4-naphthylene or 4,4'-biphenylene.

Examples of Z' as $C_2$–$C_{12}$alkanoyl are propionyl, butyryl, octanoyl or dodecanoyl, but preferably acetyl.

As $C_2$–$C_{10}$alkylene, $C_6$–$C_{15}$arylene or $C_6$–$C_{12}$cycloalkylene D is defined as under (b).

The following are examples of polyalkylpiperidine compounds of this class:
56) 3-benzyl-1,3,8-triaza-7,7,9,9-tetramethylspiro[4.5]-decane-2,4-dione
57) 3-n-octyl-1,3,8-triaza-7,7,9,9-tetramethylspiro[4.5]-decane-2,4-dione
58) 3-allyl-1,3,8-triaza-1,7,7,9,9-pentamethylspiro[4.5]-decane-2,4-dione
59) 3-glycidyl-1,3,8-triaza-7,7,8,9,9-pentamethylspiro[4.5]decane-2,4-dione
60) 1,3,7,7,8,9,9-heptamethyl-1,3,8-triazaspiro[4.5]decane-2,4-dione
61) 2-isopropyl-7,7,9,9-tetramethyl-1-oxa-3,8-diaza-4-oxospiro[4.5]decane
62) 2,2-dibutyl-7,7,9,9-tetramethyl-1-oxa-3,8-diaza-4-oxospiro[4.5]decane
63) 2,2,4,4-tetramethyl-7-oxa-3,20-diaza-21-oxodispiro[5.1.11.2]heneicosane
64) 2-butyl-7,7,9,9-tetramethyl-1-oxa-4,8-diaza-3-oxospiro[4,5]decane
65) 8-acetyl-3-dodecyl-1,3,8-triaza-7,7,9,9-tetramethylspiro[4,5]decane-2,4-dione
or the compounds of the following formulae:

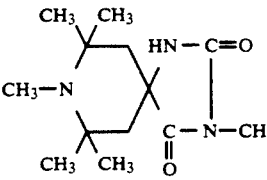 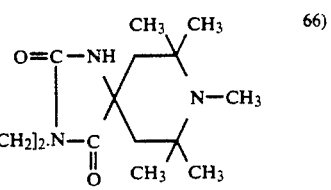

66)

-continued

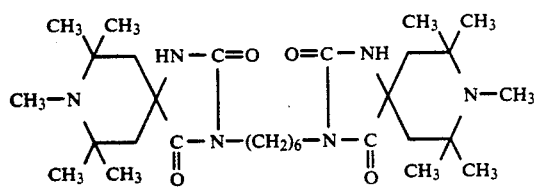  67)

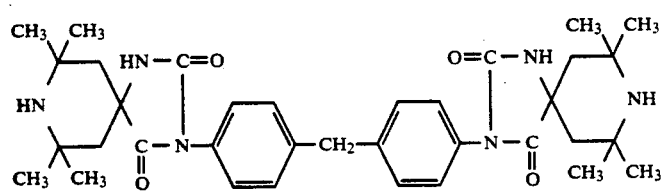  68)

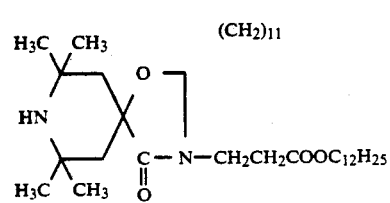  69)

(e) Compounds of the formula VII which, for their part, are preferred,

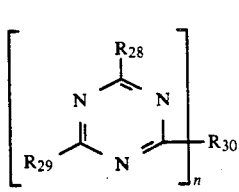  VII and in which n is the number 1 or 2 and $R_{28}$ is a group of the formula

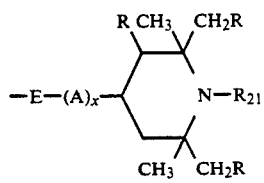

in which R and $R_{21}$ are as defined under (a), E is —O— or —$NR_{21}$—, A is $C_2$-$C_6$alkylene or —$(CH_2)_3$—O— and x is the number 0 or 1, $R_{29}$ is $R_{28}$ or is one of the groups —$NR_{31}R_{32}$, —$NHCH_2OR_{33}$ or —N(C-$H_2OR_{33})_2$, and, if n is 1, $R_{30}$ is $R_{28}$ or $R_{29}$ and, if n is 2, is a group —E—B—E— in which B is $C_2$-$C_6$alkylene which can be interrupted by —$N(R_{31})$—, $R_{11}$ is $C_1$-$C_{12}$alkyl, cyclohexyl, benzyl or $C_1$-$C_4$hydroxyalkyl or a group of the formula

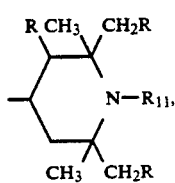

$R_{32}$ is $C_1$-$C_{12}$alkyl, cyclohexyl, benzyl or $C_1$-$C_4$hydroxyalkyl and $R_{33}$ is hydrogen, $C_1$-$C_{12}$alkyl or phenyl, or $R_{31}$ and $R_{32}$ together are $C_4$-$C_5$alkylene or $C_4$-$C_5$oxaalkylene, for example

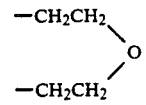

or a group of the formula

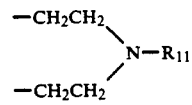

or $R_{31}$ and $R_{32}$ are each a group of the formula

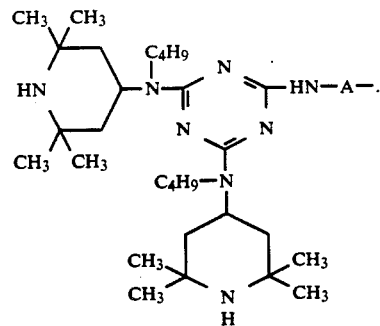

Any $C_1$-$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

If any substituents are $C_1$-$C_4$hydroxyalkyl, they are, for example, 2-hydroxyethyl, 2-hydroxypropyl, 3-hydroxypropyl, 2-hydroxybutyl or 4-hydroxybutyl.

Examples of A as $C_2$-$C_6$alkylene are ethylene, propylene, 2,2-dimethylpropylene, tetramethylene or hexamethylene.

$R_{31}$ and $R_{32}$ together as $C_4$–$C_5$alkylene or oxaalkylene are, for example, tetramethylene, pentamethylene or 3-oxapentamethylene.
The compounds of the following formulae are examples of polyalkylpiperidine compounds of this class:
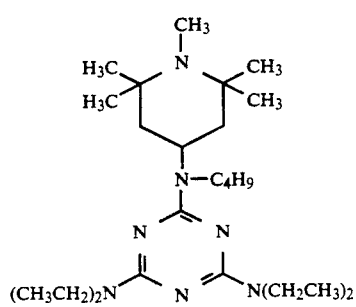
70)
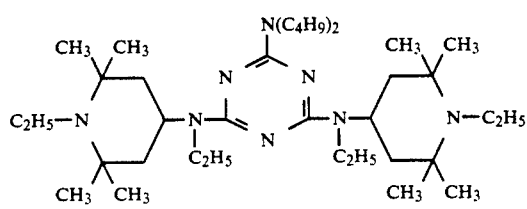
71)
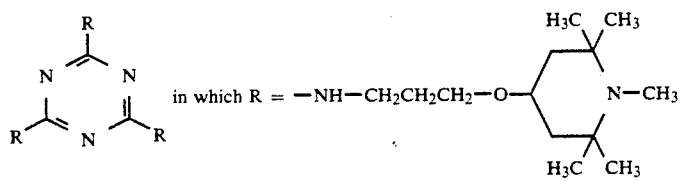
in which R = —NH—CH$_2$CH$_2$CH$_2$—O—
72)
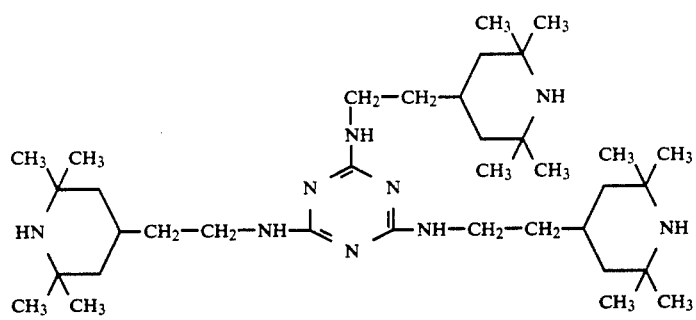
73)
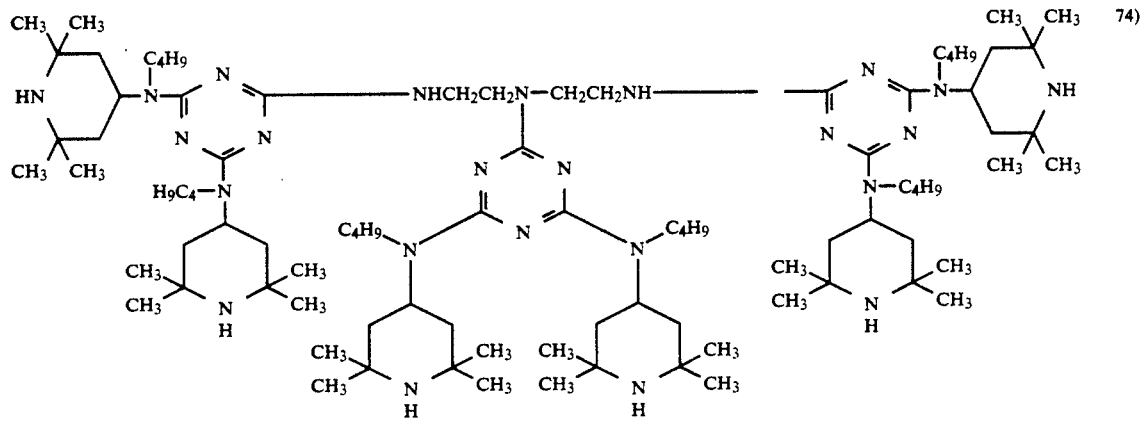
74)

-continued
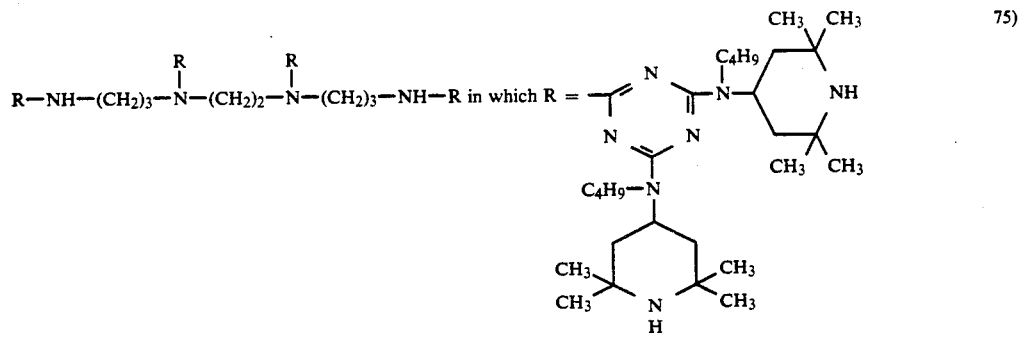
75)
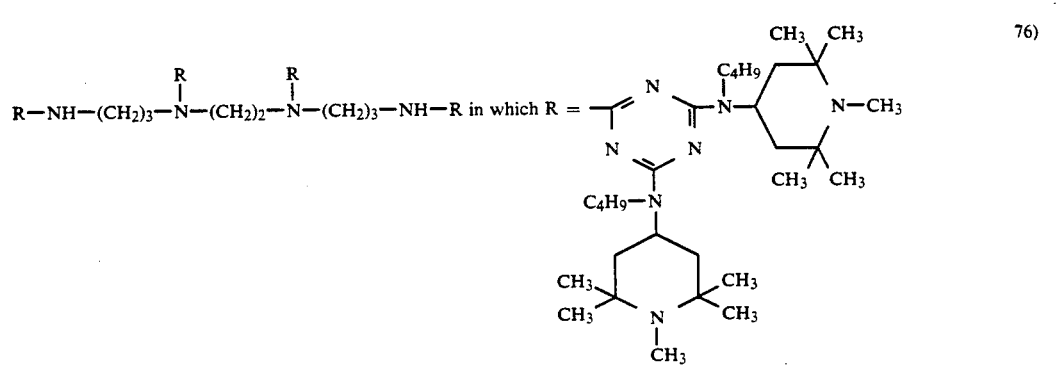
76)
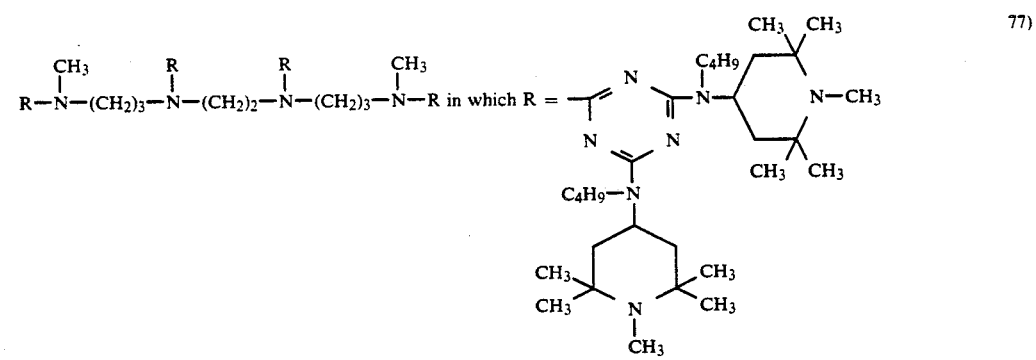
77)
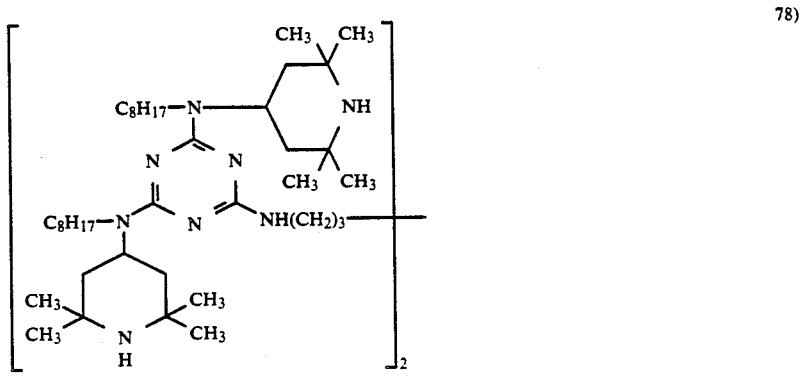
78)

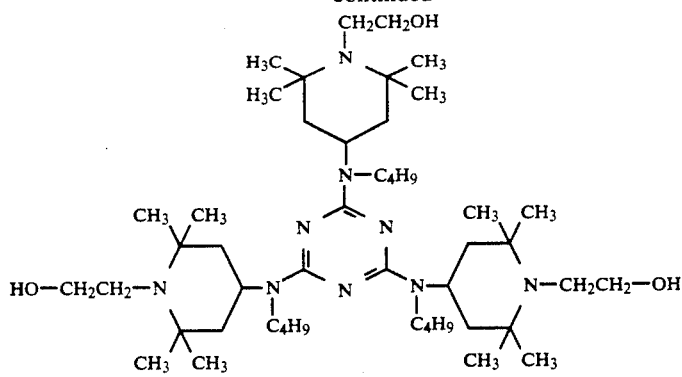

79)

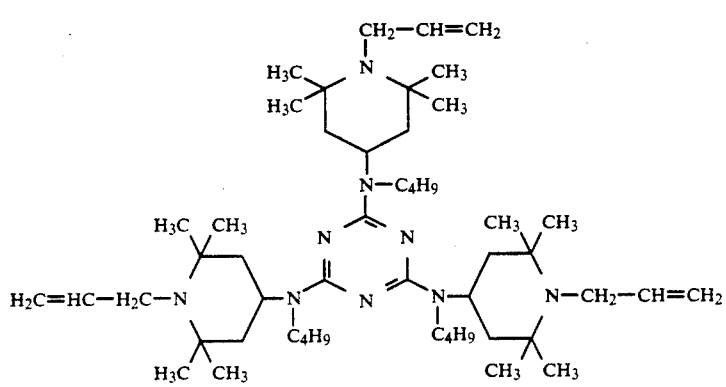

80)

(f) Oligomeric or polymeric compounds in which the recurring structural unit contains a 2,2,6,6-tetraalkylpiperidine radical of the formula III, in particular polyesters, polyethers, polyamides, polyamines, polyurethanes, polyureas, polyaminotriazines, poly(meth)acrylates, poly(meth)acrylamides and copolymers thereof containing such radicals.

The compounds of the following formulae in which m is a number from 2 to about 200 are examples of 2,2,6,6-polyalkylpiperidine light stabilisers of this class.

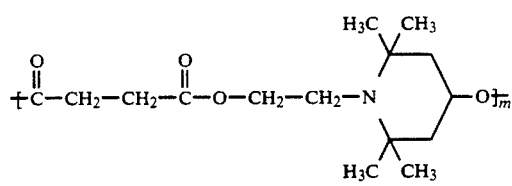

81)

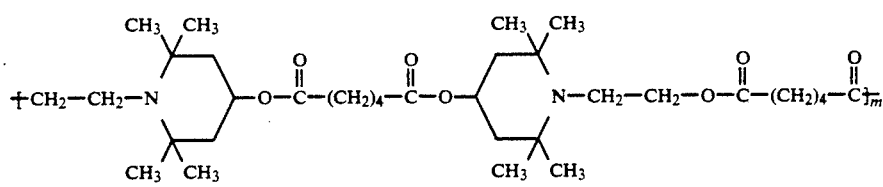

82)

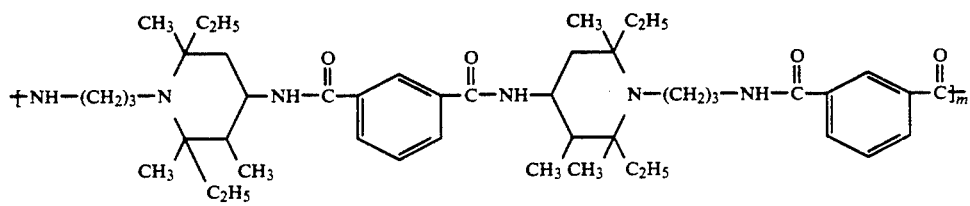

83)

-continued
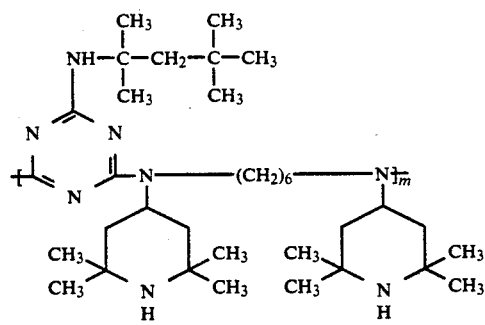
84)
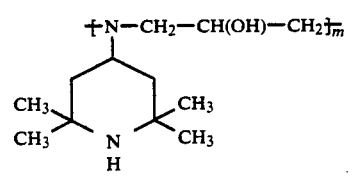
85)
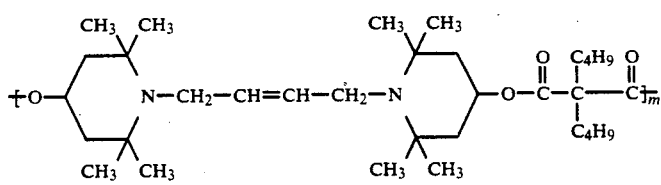
86)
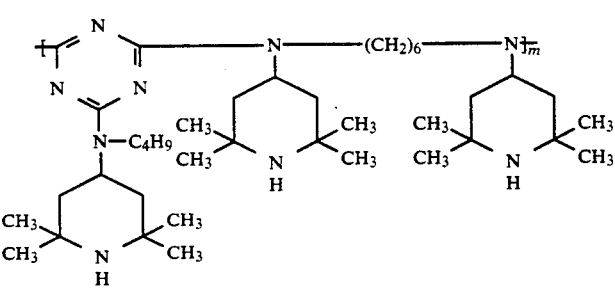
87)
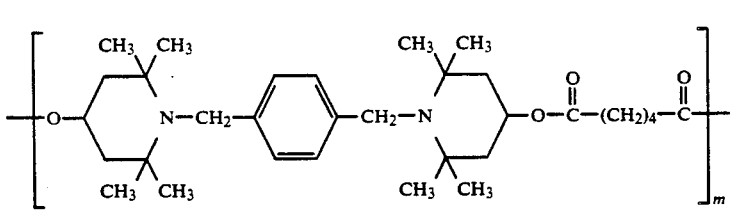
88)
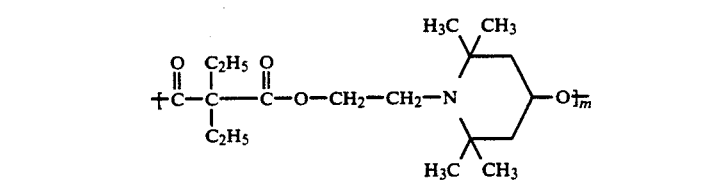
89)
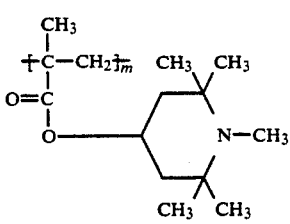
90)

-continued

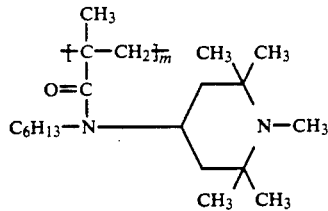
91)

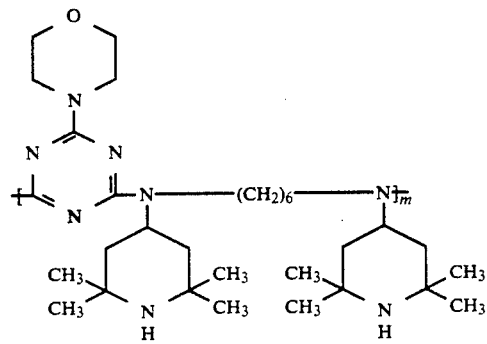
92)

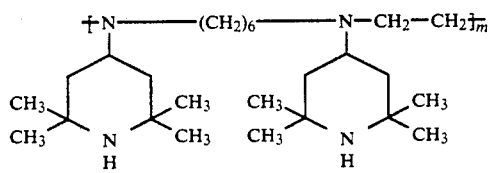
93)

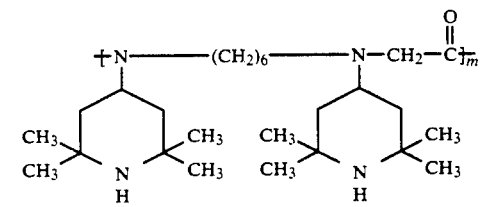
94)

Of these classes of compounds, the classes a), d), e) and f) are particularly suitable, especially the compounds Nos. 10, 13, 14, 23, 24, 28, 29, 63, 65, 75, 77, 81, 84, 92 and 93.

Compounds of the formula

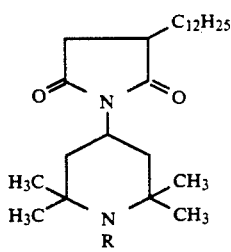
(5)

in which R is hydrogen, methyl or acetyl have led to particularly good results in combination with the UV absorber mixtures used in accordance with the invention.

The following example illustrates the invention further, without limiting it thereto. Parts and percentages are by weight, unless stated otherwise.

EXAMPLE 1

The UV absorbers of the formulae

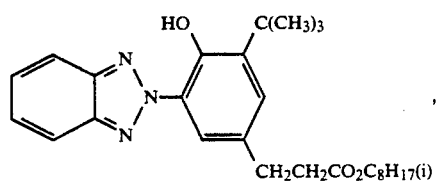
(100)

-continued

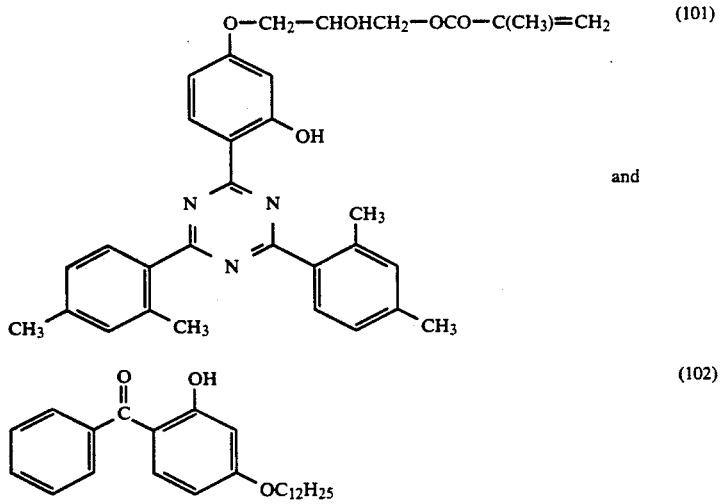

are tested in a two-layer metallic coating.

The UV absorbers are incorporated into 10 g of xylene and are added, in the amounts indicated in the table below (% of pure UV absorber, in each case relative to the solids contents of the coating), to a clear lacquer of the following composition:

| | |
|---|---|
| URACRON ® XB (DSM Resin BV) (50%) | 59.2 parts |
| CYMEL ® 327 (Cyanamid Corp.) (90%) | 11.6 parts |
| Butylglycol acetate | 5.5 parts |
| Xylene | 19.4 parts |
| Butanol | 3.3 parts |
| BAYSILON ® A (Bayer AG) (1% in xylene) | 1.0 part |

The clear lacquer is diluted with a mixture of xylene/butanol/butylglycol acetate (13:6:1) to a sprayable state and is sprayed onto a previously prepared substrate (coil-coated aluminium sheet, automotive filler and silver-metallic basecoat) and stoved for 30 minutes at 130° C. This results in a dry layer thickness of 40–50 μm of clear lacquer.

The samples are subjected to an accelerated weathering.

The results of a 1600-hour weathering of the samples in a Xenon-Weatherometer (CAM 159, Atlas Corp.) are collated in Table 1.

TABLE 1

| Sample containing UV absorber of the formula | DOI (%) as specified in ASTM E 430 |
|---|---|
| 1.5% (100) | 67 |
| 1.5% (101) | 41 |
| 0.75% (100) and 0.75% (101) | 87 |
| 1.5% (100) | 67 |
| 1.5% (102) | 47 |
| 0.75% (100) and 0.75% (102) | 75 |

The samples stabilised with the UV absorber mixtures exhibit a higher resistance to weathering than samples containing only one single UV absorber in the same proportion.

EXAMPLE 2

Example 1 is repeated using the compounds of the formulae (100) and (101) and corresponding samples are also subjected to weathering in the open for 12 months in Florida. Table 2 shows the results obtained:

TABLE 2

| Sample containing UV absorber of the formula | DOI (% relative to initial value) 12 months in Florida |
|---|---|
| 1.5% (100) | 90 |
| 1.5% (101) | 90 |
| 0.75% (100) and 0.75% (101) | 95 |

EXAMPLE 3

A 2K-PUR clear lacquer is prepared from the following components:

| | |
|---|---|
| MACRINAL ® SM 510 (60%) | 75 parts |
| Butylglycol acetate | 15 parts |
| SOLVESSO ® 100 | 6.1 parts |
| Methyl isobutyl ketone | 3.6 parts |
| Zinc octoate (8% solution in toluene) | 0.1 part |
| BYK ® 300 | 0.2 part |
| | 100.0 parts |

The UV absorbers to be tested, dissolved in 10 ml of xylene, are added to this clear lacquer in the proportions indicated. After the addition of 30 parts of DESMODUR ® N75 as a curing agent, the clear lacquer is diluted with xylene to a sprayable state, the finished lacquer is applied to a previously prepared substrate (coil-coated aluminium sheet, automotive filler and silver-metallic basecoat) and is stoved for 30 minutes at 90° C. This results in a dry film thickness of approx. 40–50 μm.

The samples are exposed to weathering in a Xenon-Weatherometer (Atlas: CAM 159; KFA method) and the 20° gloss (DIN 67 530) is measured.

TABLE 3

| Sample containing UV absorber of the formula | 20° gloss after 800 hours |
|---|---|
| 1.6% (100) | 30 |
| 1.6% (103) | 48 |
| 1.6% (104) | 50 |
| 1.6% (105) | 38 |
| 1.6% (103) and (105) in a weight ratio of 1:2 | 60 |

TABLE 3-continued

| Sample containing UV absorber of the formula | 20° gloss after 800 hours |
|---|---|
| 1.6% (103) and (104) in a weight ratio of 2:1 | 76 |
| 1.6% (100) and (105) in a weight ratio of 1:2 | 55 |

[% relative to solids content of the clear lacquer (including curing agent)]

The compounds of the formulae (103), (104) and (105) have the following structure: (103) reaction product of

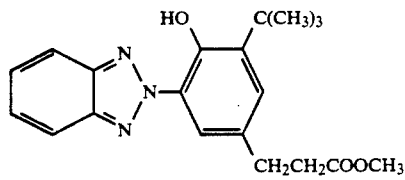

with polyethylene glycol of molecular weight 300.

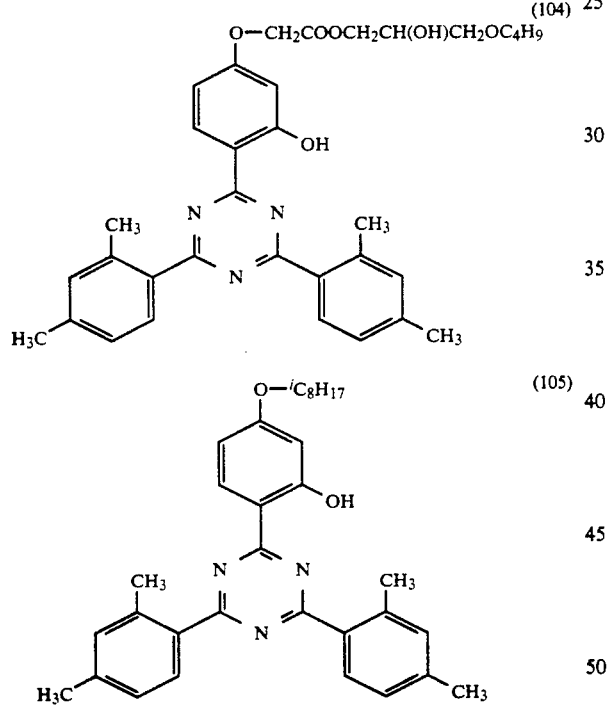

EXAMPLE 4

Samples as in Example 3 containing compounds of the formulae (103), (106) and (107) as UV absorbers are subjected to a UVCON weathering (Atlas, UVB 313, 8 hours of UV irradiation at 70° C. and 4 hours of condensation at 50° C.). The 20° gloss (DIN 67 530) is then determined after 1600 hours of weathering.

TABLE 4

| Sample containing UV absorber of the formula | 20° gloss after 1600 hours |
|---|---|
| 1.6% (103) | 4 |
| 1.6% (106) | 1 |
| 1.6% (107) | 8 |
| 1.6% (103) and (107) in | 30 |

TABLE 4-continued

| Sample containing UV absorber of the formula | 20° gloss after 1600 hours |
|---|---|
| a weight ratio of 1:2 | |
| 1.6% (106) and (107) in a weight ratio of 2:1 | 39 |

[% relative to solids content of the clear lacquer (including curing agent)]

The compounds of the formulae (106) and (107) have the following structure:

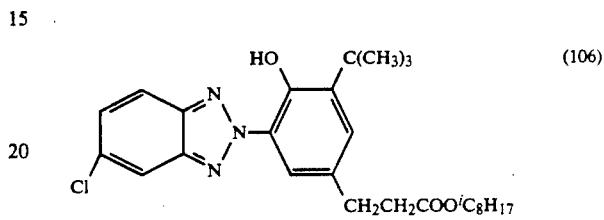

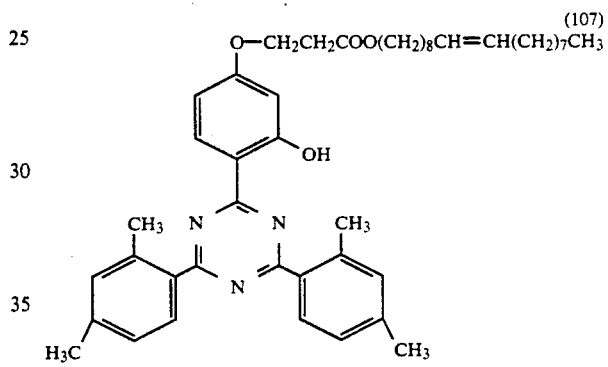

EXAMPLE 5

Example 4 is repeated using the compounds of the formulae (108) and (109) as UV absorbers.

TABLE 5

| Sample containing UV absorber of the formula | 20° gloss after 1600 hours |
|---|---|
| 1.5% (108) | cracked* after 1200 hours |
| 1.5% (109) | 4 |
| 0.75% (108) and 0.75% (109) | 43 |

[% relative to the solids content of the clear lacquer (including curing agent)]
*[crack formation measured by the TNO scale]

The compounds of the formulae (108) and (109) have the following structure:

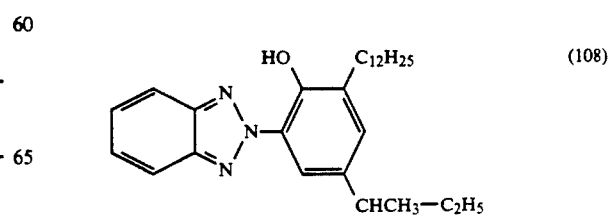

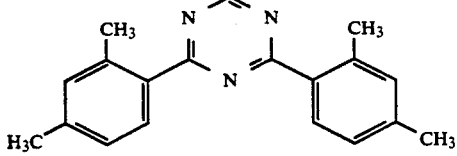

(109)

EXAMPLE 6

The coating system according to Example 2 is applied to Uniprime (PPG; ED 3150) coated aluminium sheets using the compounds of the formulae (105), (106) and (109) as UV absorbers, and weathering is carried out as follows: QUV (Q-Panel; UVA-340; 8 hours' UV irradiation at 70° C.; 4 hours' condensation at 50° C.). The change in the Yellowness Index ($\Delta$YI, ASTM D 1925) and the colour difference $\Delta$E (DIN 6174; weathered/unweathered) are then determined.

TABLE 6

| Sample containing UV absorber of the formula | after 500 hours | |
|---|---|---|
| | $\Delta$YI | $\Delta$E |
| 1.5% (106) | 4.0 | 0.8 |
| 1.5% (105) | 4.8 | 1.3 |
| 1.5% (109) | 7.1 | 1.9 |
| 0.75% (106) and 0.75% (105) | 2.3 | 0.3 |
| 0.75% (106) and 0.75% (109) | 1.7 | 0.2 |

[% relative to solids content of the clear laquer (including curing agent)]

EXAMPLE 7

A clear lacquer of the following composition is prepared:

| | |
|---|---|
| URACRON ® 2263 XB (50%) | 54.5 parts |
| CYMEL ® 327 (90%) | 16.3 parts |
| Butylglycol acetate | 5.5 parts |
| Xylene | 19.4 parts |
| n-Butanol | 3.3 parts |
| BAYSILON ® A (1% in xylene) | 1 part |
| | 100.0 parts |

The UV absorbers to be tested of the formulae (103) and (110), dissolved in 10 g of xylene, are incorporated into this clear lacquer. The clear lacquer is diluted to a sprayable state with a mixture of xylene, butanol and butylglycol acetate (weight ratio 13:6:1) and it is applied to a small glass plate. After stoving (130° C., 30 minutes), the result is a dry film thickness of about 20 μm. The loss of UV absorber is determined by means of UV spectroscopy after a UVCON weathering (Atlas; UVB-313; 8 hours of UV irradiation at 70° C. and 4 hours of condensation at 50° C.).

TABLE 7

| Sample containing UV absorber of the formula | λmax | Loss of UV absorber after 1000 hours |
|---|---|---|
| 2% (103) | 342 | 30% |

TABLE 7-continued

| Sample containing UV absorber of the formula | λmax | Loss of UV absorber after 1000 hours |
|---|---|---|
| 2% (110) | 338 | 21% |
| 1% (103) and 1% (110) | 339 | 16% |

[% relative to solids content of the clear lacquer]

The compound of the formula (110) has the following structure:

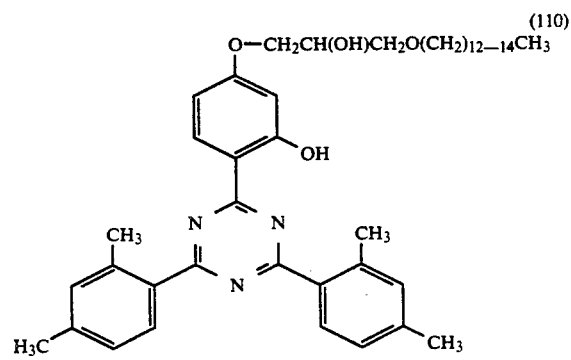

(110)

EXAMPLE 8

The coating system according to Example 7 is applied to Uniprime (PPG; ED 3150) coated aluminium sheets using the compounds of the formulae (103) and (110) as UV absorbers, and it is exposed to a UVCON weathering as described in Example 7. The crosshatch test specified in DIN 53 151 followed by the strip tear-off test is then carried out on the samples. The assessment of the crosshatch test is also carried out as in

TABLE 8

| Sample containing UV absorber of the formula | Assessment |
|---|---|
| 2% (103) | G + 3 − 4 |
| 2% (110) | G + 1 − 2 |
| 1% (103) and 1% (110) | G + 0 |

[% relative to the solids content of the clear lacquer]

What is claimed is:

1. A coating composition which contains, as the UV absorber, a mixture of at least one 2-hydroxyphenylbenzotriazole and at least one 2-hydroxyphenyltriazine, wherein the 2-hydroxyphenylbenzotriazole has the formula 1a or 1b

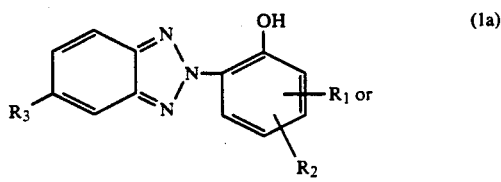

(1a)

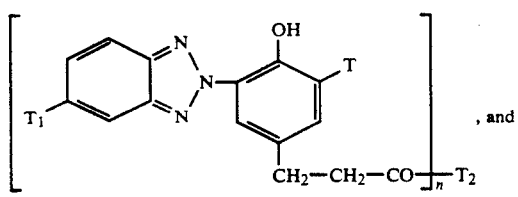

the 2-hydroxyphenyltriazine has formula 2

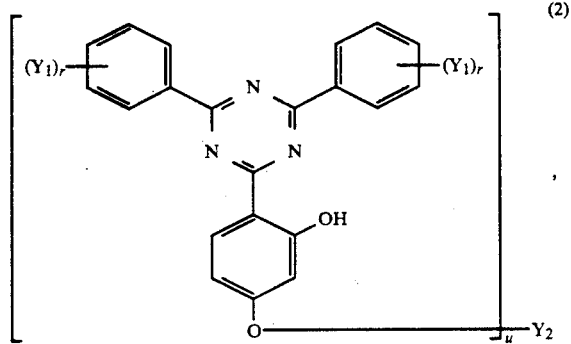

in which in formula 1a or 1b $R_1$ is hydrogen, alkyl having 1 to 24 carbon atoms, phenylalkyl having 1 to 4 carbon atoms in the alkyl moiety, $R_2$ is hydrogen, halogen, alkyl having 1 to 18 carbon atoms or phenylalkyl having 1 to 4 carbon atoms in the alkyl moiety, and $R_3$ is hydrogen, chlorine or alkyl having 1 to 4 carbon atoms; with at least one of the radicals $R_1$ and $R_2$ being other than hydrogen;

T is hydrogen or alkyl having 1 to 6 carbon atoms, $T_1$ is hydrogen, chlorine or alkyl having 1 to 4 carbon atoms, n is 1 or 2, when n is 1, $T_2$ is chlorine or a radical of the formula —$OT_3$, wherein $T_3$ is hydrogen, alkyl which has 1 to 18 carbon atoms and is unsubstituted or substituted by 1 to 3 hydroxyl groups; alkyl of 3 to 18 carbon atoms interrupted once or several times by —O— and is unsubstituted or substituted by hydroxyl; alkenyl which has 2 to 18 carbon atoms and is unsubstituted or substituted by hydroxyl; phenylalkyl having 1 to 4 carbon atoms in the alkyl moiety, or a radical of the formula —$CH_2CH(OH)$—$T_7$ or glycidyl;

where $T_7$ is hydrogen, alkyl having 1 to 18 carbon atoms or phenyl, and when n is 2, $T_2$ is a radical of the formula —O—$T_9$—O—, wherein $T_9$ is alkylene having 2 to 8 carbon atoms, alkenylene having 4 to 8 carbon atoms, cyclohexylene, alkylene which has 2 to 8 carbon atoms and is interrupted once or several times by —O—; and in which in formula 2 u is 1 or 2 r is an integer from 1 to 3 the substituents $Y_1$ independently of one another are hydrogen, hydroxyl, halogenomethyl, alkyl having 1 to 12 carbon atoms, alkoxy having 1 to 18 carbon atoms or halogen, when u is 1, $Y_2$ is alkyl having 1 to 18 carbon atoms, alkyl which has 1 to 12 carbon atoms and is substituted by —COOH, —$COOY_8$, —$CONH_2$, —$CONHY_9$, —$CONY_9Y_{10}$, —CN, —$OCOY_{11}$ or mixtures thereof; alkyl which has 4 to 20 carbon atoms which is interrupted by one or more oxygen atoms and is unsubstituted or substituted by hydroxyl or alkoxy having 1 to 12 carbon atoms; alkenyl having 3 to 6 carbon atoms, glycidyl, phenylalkyl which has 1 to 5 carbon atoms in the alkyl moiety and is unsubstituted or substituted by hydroxyl, chlorine and/or methyl; —$COY_{12}$ or —$SO_2Y_{13}$, wherein $Y_8$ is alkyl having 1 to 18 carbon atoms, alkenyl having 3 to 18 carbon atoms, alkyl which has 3 to 20 carbon atoms and is interrupted by one or more oxygen atoms or said alkyl substituted by hydroxyl; alkenyl having 3 to 18 carbon atoms, glycidyl or phenylalkyl having 1 to 5 carbon atoms in the alkyl moiety, $Y_9$ and $Y_{10}$ independently of one another are alkyl having 1 to 12 carbon atoms, alkoxyalkyl having 3 to 12 carbon atoms, dialkylaminoalkyl having 4 to 16 carbon atoms or cycloalkyl having 5 to 12 carbon atoms, $Y_{11}$ is alkyl having 1 to 18 carbon atoms, alkenyl having 2 to 18 carbon atoms or phenyl, $Y_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, and $Y_{13}$ is alkyl having 1 to 18 carbon atoms, phenyl or alkylphenyl having 1 to 8 carbon atoms in the alkyl radical; and when u is 2, $Y_2$ is alkylene having 2 to 16 carbon atoms, alkenylene having 4 to 12 carbon atoms, xylylene, alkylene which has 3 to 20 carbon atoms and is interrupted by one or more —O— atoms and/or is substituted by hydroxyl; —$CH_2CH(OH)CH_2$—O—$Y_{15}$—$OCH_2CH(OH)CH_2$— or —$(CH_2)_m$—$CO_2$—$Y_{18}$—$OCO$—$(CH_2)_m$—, in which m is 1, 2 or 3, wherein $Y_{15}$ is alkylene having 2 to 10 carbon atoms, phenylene or a group phenylene-M-phenylene in which M is —O—, —S—, —$SO_2$—, —$CH_2$— or —$C(CH_3)_2$—, and $Y_{18}$ is alkylene having 2 to 10 carbon atoms or alkylene which has 4 to 20 carbon atoms and is interrupted once or several times by oxygen.

2. A coating composition according to claim 1, wherein, in the mixture, the 2-hydroxy-phenylbenzotriazole is present in a weight ratio of 3:1 to 1:3, to 2-hydroxyphenyltriazine.

3. A composition according to claim 2 wherein the weight ratio of 2-hydroxyphenylbenzotriazole to 2-hydroxyphenyltriazine is 2:1 to 1:2.

4. A coating composition according to claim 1, wherein the substituent $R_1$ or $R_2$ in the compounds of the formula (1a) is located in the ortho-position or para-position relative to the hydroxyl group.

5. A coating composition according to claim 1, in which, in the compounds of the formula (1a), $R_1$ is hydrogen or alkyl having 1 to 20 carbon atoms, $R_2$ is hydrogen, alkyl having 1 to 18 carbon atoms or phenylalkyl having 1 to 4 carbon atoms in the alkyl moiety and $R_3$ is hydrogen, chlorine or alkyl having 1 to 4 carbon atoms.

6. A coating composition according to claim 5, in which $R_1$ is in the ortho-position relative to the hydroxyl group and is hydrogen or alkyl having 4 to 12 carbon atoms, $R_2$ is in the para-position relative to the hydroxyl group and is alkyl having 1 to 6 carbon atoms or cumyl and $R_3$ is hydrogen or chlorine.

7. A coating composition according to claim 6, in which $R_1$ is alkyl having 8 to 12 carbon atoms, $R_2$ is alkyl having 4 to 6 carbon atoms and $R_3$ is hydrogen.

8. A coating composition according to claim 1, in which, in the compounds of the formula (1b), T is alkyl having 1 to 6 carbon atoms, $T_1$ is hydrogen, chlorine or alkyl having 1 to 4 carbon atoms, n is 1 or 2 and, when n is 1, $T_2$ is one of the radicals of the formula —$OT_3$ and, when n is 2, $T_2$ is a radical of the formula —O—$T_9$—O— in which $T_3$ is hydrogen, alkyl having 1 to 18 carbon atoms or alkyl which has 3 to 18 carbon atoms and is interrupted once or several times by —O—, and $T_9$ is alkylene having 2 to 8 carbon atoms, alkenylene having 4 to 8 carbon atoms or alkylene which has 2 to 18 carbon atoms and is interrupted once or several times by —O—.

9. A coating composition according to claim 8, in which T is alkyl having 1 to 4 carbon atoms, $T_1$ is hydrogen or chlorine and $T_2$ is one of the radicals of the formula —$OT_3$ or —O—$T_9$—O— in which $T_3$ is hydrogen, alkyl having 1 to 12 carbon atoms or a radical of the formula —$C_2H_4$—$(OC_2H_4)_{3-7}$—H and $T_9$ is alkylene having 2 to 8 carbon atoms or a radical of the formula —$C_2H_4$—$(OC_2H_4)_{3-7}$—O—.

10. A coating composition according to claim 9, in which $T_2$ is a radical of the formula —$OT_3$ and $T_3$ is alkyl having 1 to 12 carbon atoms or a radical of the formula —$C_2H_4$—$(OC_2H_4)_{3-7}$—H.

11. A coating composition according to claim 1, in which, in the compounds of the formula (2), the substituents $Y_1$ are hydrogen, alkyl having 1 to 12 carbon atoms or halogen, when u is 1, $Y_2$ is alkyl having 1 to 18 carbon atoms, alkyl which has 1 to 12 carbon atoms and is substituted by, —$COOY_8$, —$CONY_9Y_{10}$ and/or —$OCOY_{11}$, glycidyl or phenylalkyl having 1 to 4 carbon atoms in the alkyl moiety, or when u is 2, $Y_2$ is alkylene having 2 to 16 carbon atoms, alkenylene having 4 to 12 carbon atoms, xylene or alkylene which has 3 to 20 carbon atoms, is interrupted by one or more —O— atoms and/or is substituted by hydroxyl, the substituents $Y_8$ to $Y_{11}$ being as defined in claim 1.

12. A coating composition according to claim 11, in which the substituents $Y_1$ are hydrogen, alkyl having 1 to 4 carbon atoms or chlorine, when u is 1, $Y_2$ is alkyl which has 1 to 4 carbon atoms and is unsubstituted or substituted by, —$COOY_8$, —$CONY_9Y_{10}$ and/or —$OCOY_{11}$, glycidyl or benzyl, or when u is 2, $Y_2$ is alkylene having 6 to 12 carbon atoms, butenylene, xylylene or alkylene which has 3 to 20 carbon atoms, is interrupted by one or more —O— atoms and/or is substituted by hydroxyl, $Y_8$ being alkyl having 4 to 12 carbon atoms, alkenylene having 12 to 18 carbon atoms or alkyl which has 6 to 20 carbon atoms, is interrupted by one or more —O— atoms and/or is substituted by hydroxyl, $Y_9$ and $Y_{10}$ independently of one another being alkyl having 4 to 8 carbon atoms and $Y_{11}$ being alkyl having 1 to 8 carbon atoms or alkenyl having 2 or 3 carbon atoms.

13. A coating composition according to claim 11, in which u is 1 and r is 2, $Y_1$ is alkyl having 1 to 4 carbon atoms and $Y_2$ is alkyl having 1 to 18 carbon atoms or alkyl which has 1 to 12 carbon atoms and is substituted by, —$COOY_8$ and/or —$OCOY_{11}$, $Y_8$ being alkyl having 1 to 18 carbon atoms, alkenyl having 3 to 18 carbon atoms or alkyl which has 3 to 20 carbon atoms, is interrupted by one or more oxygen atoms and/or is substituted by hydroxyl, and $Y_{11}$ being alkenyl having 2 to 18 carbon atoms.

14. A coating composition according to claim 13, in which $Y_2$ is alkyl having 1 to 8 carbon atoms or alkyl which has 1 to 4 carbon atoms and is substituted by, —$COOY_8$ and/or —$OCOY_{11}$, $Y_8$ being alkyl having 8 to 12 carbon atoms, alkenyl having 12 to 18 carbon atoms or alkyl which has 5 to 10 carbon atoms, is interrupted by an oxygen atom and is substituted by hydroxyl, and $Y_{11}$ being alkenyl having 2 to 8 carbon atoms.

15. A coating composition according to claim 11, in which $Y_1$ is methyl and $Y_2$ is an octyl radical or alkyl which has 1 to 3 carbon atoms and is substituted by, —$COOY_8$ and/or —$OCOY_{11}$, $Y_8$ being a decyl or octadecenyl radical or alkyl which has 7 carbon atoms and is substituted by hydroxyl and interrupted by an oxygen atom, and $Y_{11}$ being propenyl.

16. A coating composition according to claim 1, which additionally contains at least one sterically hindered amine, in particular an amine of this type containing at least one radical of the formula

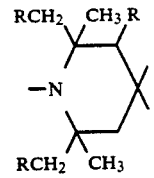

in which R is hydrogen or methyl.

17. A paint film obtainable by applying a coating composition according to claim 1 to a surface and curing the coating composition which has been applied.

* * * * *